(12) United States Patent  (10) Patent No.: US 8,237,954 B2
Kubo  (45) Date of Patent: Aug. 7, 2012

(54) PRINT SYSTEM, PRINT APPARATUS, PRINT PROCESSING METHOD, AND PROGRAM

(75) Inventor: Shusaku Kubo, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 903 days.

(21) Appl. No.: 11/302,539

(22) Filed: Dec. 14, 2005

(65) Prior Publication Data

US 2007/0035774 A1 Feb. 15, 2007

(30) Foreign Application Priority Data

Aug. 10, 2005 (JP) ............................. P. 2005-232349

(51) Int. Cl.
 *G06F 3/12* (2006.01)
(52) U.S. Cl. ..................... 358/1.15; 358/3.28; 382/100
(58) Field of Classification Search .................. 358/1.15; 709/201–203
 See application file for complete search history.

(56) References Cited

U.S. PATENT DOCUMENTS

| 5,661,506 | A | * | 8/1997 | Lazzouni et al. ............. 345/179 |
| 5,832,301 | A | * | 11/1998 | Yamaguchi ..................... 710/48 |
| 6,304,898 | B1 | * | 10/2001 | Shiigi ........................... 709/206 |
| 6,330,976 | B1 | * | 12/2001 | Dymetman et al. ........... 235/487 |
| 6,651,894 | B2 | * | 11/2003 | Nimura et al. ................ 235/494 |
| 6,693,623 | B1 | * | 2/2004 | Tillgren et al. ............... 345/156 |
| 6,700,681 | B1 | | 3/2004 | Tanaka et al. ................. 358/405 |
| 6,816,274 | B1 | * | 11/2004 | Silverbrook et al. ......... 358/1.15 |
| 6,935,565 | B2 | * | 8/2005 | Nimura et al. ................ 235/468 |
| 6,958,747 | B2 | * | 10/2005 | Sahlberg et al. .............. 345/173 |
| 7,050,189 | B2 | * | 5/2006 | Nishikawa ................... 358/1.15 |
| 7,156,291 | B2 | * | 1/2007 | Ikeda ............................ 235/375 |
| 7,489,415 | B2 | * | 2/2009 | Furuta et al. ................. 358/1.15 |
| 2002/0135805 | A1 | * | 9/2002 | Fahraeus et al. ............. 358/1.15 |
| 2004/0049571 | A1 | * | 3/2004 | Johnson et al. ............... 709/224 |
| 2005/0171914 | A1 | * | 8/2005 | Saitoh .............................. 705/51 |
| 2005/0219616 | A1 | | 10/2005 | Furuta et al. ................. 358/1.18 |
| 2009/0190168 | A1 | | 7/2009 | Furuta et al. ................. 358/1.15 |

FOREIGN PATENT DOCUMENTS

| JP | 2000-209418 | 7/2000 |
| JP | 2002-196909 | 7/2002 |
| JP | 2003-067363 | 3/2003 |
| JP | 2003-529852 T | 10/2003 |
| JP | 2004-528644 T | 9/2004 |
| JP | 2004-297709 | 10/2004 |
| JP | 2005-122682 | 5/2005 |

* cited by examiner

*Primary Examiner* — Richard Zhu
(74) *Attorney, Agent, or Firm* — Morgan, Lewis & Bockius LLP

(57) ABSTRACT

A print system includes: a print instruction unit that outputs a print instruction for the electronic document and print instruction specification information for specifying the print instruction; a print unit that prints the electronic document pertinent to the print instruction outputted from the print instruction unit, together with specification information specifying the electronic document or a print medium; and an output unit that outputs the specification information printed by the print unit, in association with the print instruction specification information.

22 Claims, 13 Drawing Sheets

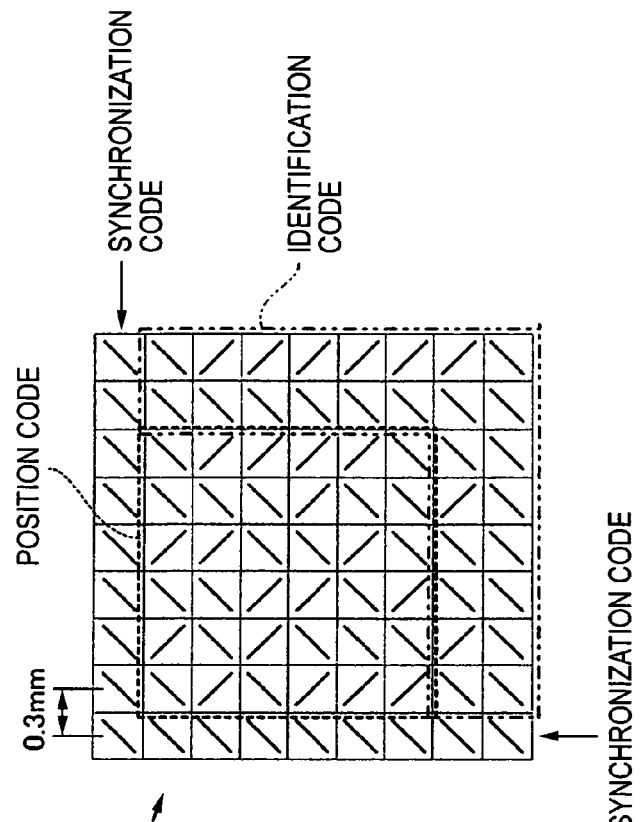
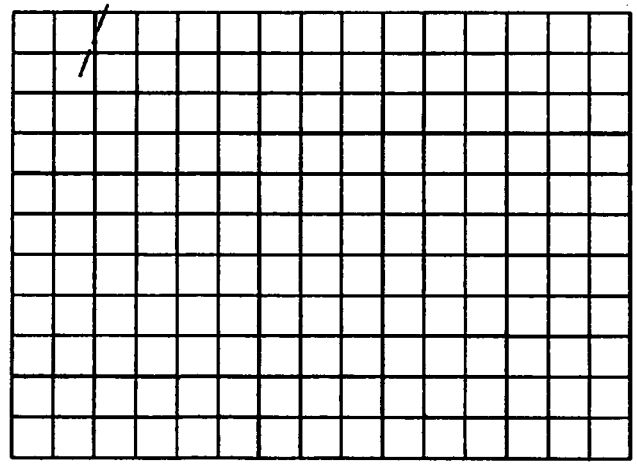
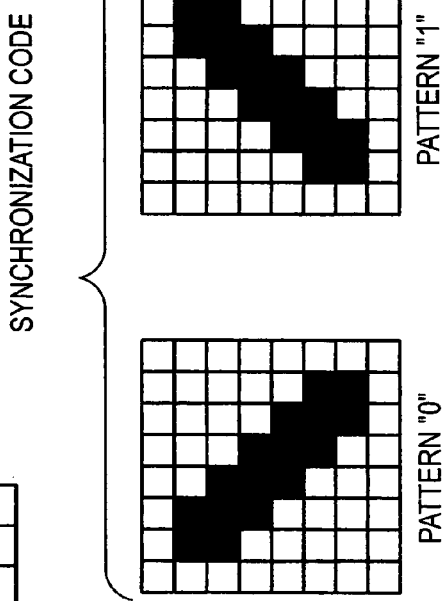
FIG. 2B
FIG. 2A
FIG. 2C

FIG. 6

| MANAGE-MENT ID | ELECTRONIC DOCUMENT NAME | PAGE-INFOR-MATION | SERVICE ADDRESS (START) | SERVICE ADDRESS (END) | PRINT-OUT TIME | ELECTRONIC DOCUMENT SIZE | PAPER SIZE | SCALE-DOWN/SCALE-UP RATIO (%) | "Nup" INFOR-MATION |
|---|---|---|---|---|---|---|---|---|---|
| 1 | docserver1.fujixerox.co.jp/Cabinet1/drawer1/folder1/document1.ppt | 1 | 1 | 60900 | 2005/1/1 10:10:15 | A4 | A4 | 100 | 1 |
| 2 | docserver1.fujixerox.co.jp/Cabinet1/drawer1/folder1/document1.ppt | 2 | 60901 | 121800 | 2005/1/1 10:10:16 | A4 | A4 | 100 | 1 |
| 3 | docserver1.fujixerox.co.jp/Cabinet1/drawer1/folder1/document1.ppt | 3 | 121801 | 182700 | 2005/1/1 10:10:17 | A4 | A4 | 100 | 1 |
| 4 | docserver1.fujixerox.co.jp/Cabinet1/drawer1/folder1/document1.ppt | 4 | 182701 | 243600 | 2005/1/1 10:10:18 | A4 | A4 | 100 | 1 |
| 5 | docserver1.fujixerox.co.jp/Cabinet1/drawer1/folder1/document1.ppt | 5 | 243601 | 304500 | 2005/1/1 10:10:19 | A4 | A4 | 100 | 1 |
| 6 | docserver1.fujixerox.co.jp/Cabinet1/drawer1/folder1/document1.ppt | 6 | 304501 | 365400 | 2005/1/1 10:10:20 | A4 | A4 | 100 | 1 |
| 7 | docserver1.fujixerox.co.jp/Cabinet1/drawer1/folder1/document2.ppt | 1 | 1 | 60900 | 2005/1/1 10:10:21 | A4 | A4 | 100 | 1 |
| 8 | docserver1.fujixerox.co.jp/Cabinet1/drawer1/folder1/document2.ppt | 2 | 60901 | 182700 | 2005/1/1 10:10:22 | A4 | A3 | 100 | 1 |
| 9 | docserver1.fujixerox.co.jp/Cabinet1/drawer1/folder1/document3.ppt | 1 | 1 | 60900 | 2005/1/1 10:10:23 | A3 | A4 | 70 | 2 |
| 10 | docserver1.fujixerox.co.jp/Cabinet1/drawer1/folder1/document3.ppt | 2 | 60901 | 121800 | 2005/1/1 10:10:24 | A3 | A4 | 70 | 2 |

PRINT SYSTEM, PRINT APPARATUS, PRINT PROCESSING METHOD, AND PROGRAM

BACKGROUND OF THE INVENTION

1. Field of the Invention

The present invention relates to a print apparatus such as copying machine or printer, a print system for managing an electronic document which is printed by the print apparatus, and so forth.

2. Background Art

In recent years, notice is taken of a technique with which a user writes a character or depicts a picture on a special sheet of paper printed with fine dots, and he/she transfers the data of, e. g., the character written on the sheet of paper, to a personal computer, a portable telephone or the like, whereby the content can be saved or transmitted by mail. With the technique, the small dots are printed on the special sheet of paper at intervals of, for example, 0.3 mm or so, and they are formed so as to depict different patterns in all individual grids of predetermined size by way of example. The address of the data of, e. g., the character written on the special sheet of paper can be specified by reading the pattern with, for example, a dedicated ball-point pen which has a built-in digital camera. Thus, the handwritten character on the sheet of paper can be utilized as electronic information.

Generally, there has been proposed, for example, a printer which outputs a position coding pattern. Here, the boundary information of that section of the whole position coding pattern which concerns an output is received from a computer which instructs the output. Besides, the position coding pattern is generated from the boundary information and is outputted. Generally, there has been proposed, for example, a system which outputs a form having a position coding pattern, to a sheet of paper. With the technique described above, the position coding pattern and the form are printed in superposition. Besides, the printed position coding pattern is optically detected so as to identify a form layout, and signals obtained therefrom are transmitted/received, whereby the intention of a user is read.

There have heretofore been techniques which endow a document with ID (identification) for identifying the document, and which include the prior-art techniques mentioned above. In general, it has been known, for example, to print a barcode on a paper document. Here, affixation methods for affixing ID information items are broadly classified as stated below.

(a) Method wherein, in creating an electronic document, an ID is affixed and is transferred to a print apparatus.

(b) Method wherein an electronic document is transferred to an ID allocation device so as to affix ID information to the electronic document, and the electronic document is transferred to a print apparatus.

(c) Method wherein an ID is allocated in a print apparatus having accepted an electronic document, and the ID is printed simultaneously with the printing of the electronic document.

However, with the technique stated above, it is a premise that the position coding pattern to be printed and a service corresponding thereto are held on a server side beforehand, and a print output is instructed under such a premise. Therefore, the range of services is very limitative, and it becomes necessary to separately build a server for management. Besides, with the technique stated above, the position coding pattern to be printed is previously determined, with the result that the special management of the position coding pattern is necessitated, so the utilization of the position coding pattern is naturally limited.

Besides, with the method (a), the information of the ID is generally large in content, so that a very long time is expended on data transmission in case of transferring data to the print apparatus. As a result, a total print time period lengthens, and a request for faster processing in recent years cannot be coped with.

Further, with the method (b), a print server needs to be separately disposed, and the configuration of a system becomes complicated.

Still further, with the method (c), even when the ID has been allocated by the print apparatus, the document to which the ID has been allocated cannot be managed. Besides, it is difficult to associate (or correlate) both a print instruction and a print result.

SUMMARY OF THE INVENTION

The present invention has been made in view of above circumstances and provides a print system.

According to an aspect of the present invention, a print system comprises: a print instruction unit that outputs a print instruction for the electronic document and print instruction specification information for specifying the print instruction; a print unit that prints the electronic document pertinent to the print instruction outputted from the print instruction unit, together with specification information specifying the electronic document or a print medium; and an output unit that outputs the specification information printed by the print unit, in association with the print instruction specification information.

According to another aspect of the present invention, a print system comprises: a print instruction apparatus that outputs a print instruction for the electronic document and print instruction specification information; a print apparatus that prints the electronic document pertinent to the print instruction outputted from the print instruction apparatus, together with specification information specifying the electronic document or a print medium; and a management apparatus that manages the electronic document; wherein the print apparatus associating the print instruction specification information and the specification information, and outputting the associated print instruction specification information and the specification information to the management apparatus.

According to still another aspect of the present invention, a print apparatus comprises: a print instruction acquisition unit for acquiring print instruction specification information for specifying a print instruction, together with the print instruction for the electronic document; a print unit for printing the electronic document on the basis of the print instruction acquired by the print instruction acquisition unit, together with specification information specifying the electronic document or a print medium; and an output unit for associating the print instruction specification information and the specification information, and then outputting them.

According to still another aspect of the present invention, a print processing method comprises: identifying the electronic document by using first identification information which is identifiable on a print instruction side before the printing of the document image of the electronic document onto the medium is ended; identifying the electronic document by using second identification information which specifies the electronic document or the medium after the document image of the electronic document and a code image which contains the second identification information is printed onto the medium; and associating the first identification information and the second identification information and outputting the associated first identification information and the second identification information.

According to still another aspect of the present invention, a storage medium readable by a computer, the storage medium storing a program of instructions executable by the computer to perform a function, the function comprises: identifying the electronic document by using first identification information which is identifiable on a print instruction side, before the printing of the document image of the electronic document onto the medium is ended; identifying the electronic document by using second identification information which specifies the electronic document or the medium, after the document image of the electronic document and a code image which contains the second identification information have been printed onto the medium; and associating the first identification information and the second identification information and outputting the associated first identification information and the second identification information.

BRIEF DESCRIPTION OF THE DRAWINGS

These and other objects and advantages of this invention will become more fully apparent from the following detailed description taken with the accompanying drawings in which:

FIGS. 2A to 2C are diagrams for explaining a two-dimensional code image which is generated by the code image generation unit of a print apparatus, and which is printed by the print unit thereof;

FIG. 6 is a diagram showing an example of a data structure which manages the correspondence between an electronic document and address information and the correspondence between the electronic document and a formal ID;

DETAILED DESCRIPTION OF THE PREFERRED EMBODIMENTS

Now, an embodiment of the present invention will be described in detail with reference to the accompanying drawings.

Figure 1:
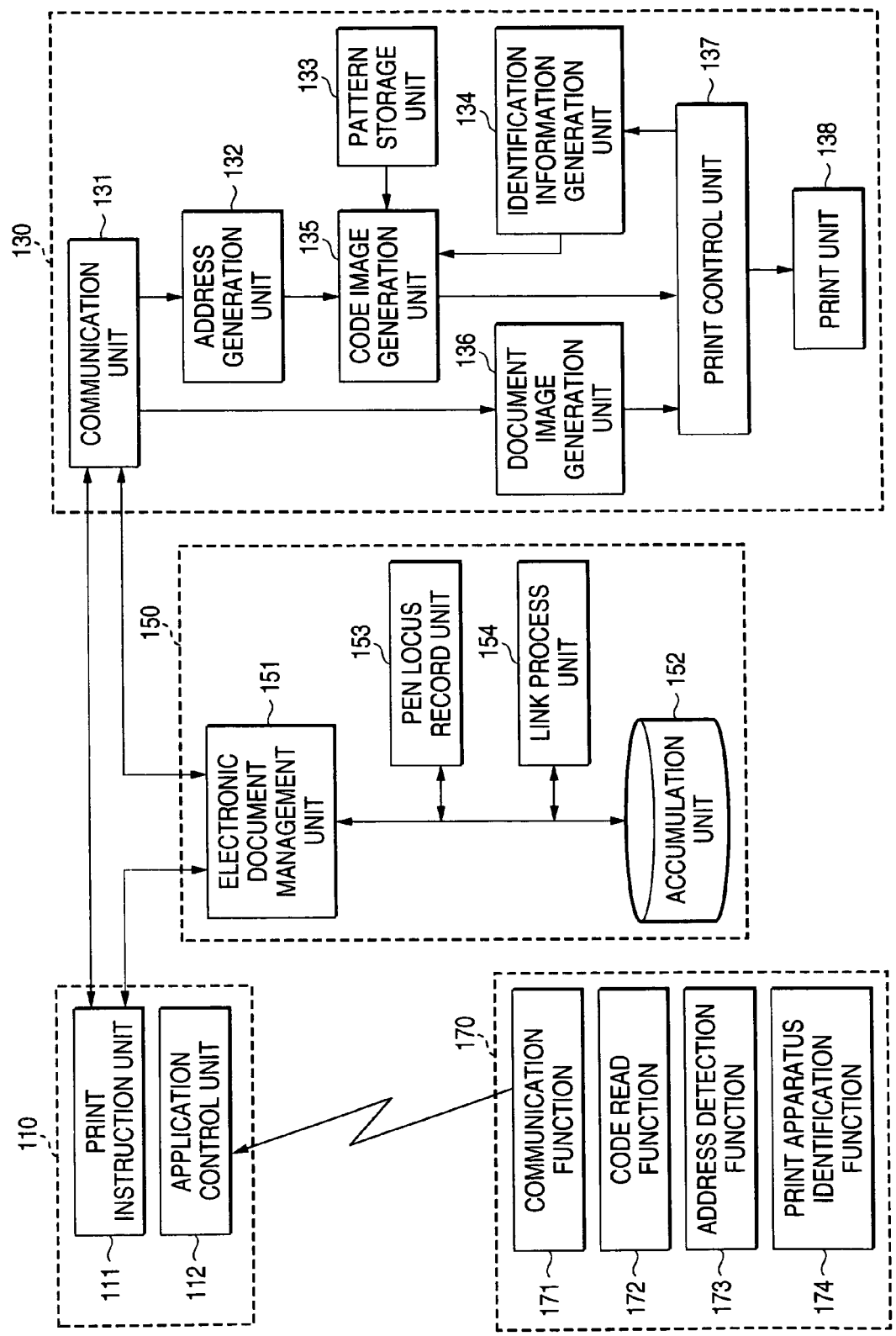
FIG. 1 is a diagram is showing the general configuration of an electronic document management system to which an embodiment is applied.

FIG. 1 is a diagram showing the general configuration of an electronic document management system to which the embodiment is applied. The electronic document management system shown in FIG. 1 includes a personal computer (PC) 110 which gives an instruction for printing an electronic document (document), by employing a tentative ID (print instruction specification information, or first identification information), and a print apparatus 130 which prints and outputs an electronic document on and to a medium (such as a sheet of paper), together with a code image obtained by encoding a formal ID (second identification information). Besides, the system includes a document management apparatus 150 which manages the relations between the tentative ID and the formal ID and between the formal ID and the electronic document, and a pen type input device 170 which reads address information on the medium that has been printed with the document image of the electronic document by the print apparatus 130 or the like. The tentative ID which is employed for the print instruction from the personal computer 110, is simple information identifiable on a print instruction side and functions as the print instruction specification information. By way of example, the tentative ID may well be a serial number such as a mere back or uniform number. On the other hand, the formal ID which is employed in the print operation of the print apparatus 130 is, for example, information uniquely specifying the medium (medium identification information) or the document ID of the electronic document. That is, the formal ID functions as specification information specifying the printed electronic document or the print medium.

Incidentally, although the term "electronic document" is used, this does not signify only the mere "document" or text information. In this application, another image such as a picture, photograph or pattern, a bitmap image, drawing information and other print information are also covered within the "electronic document". Besides, the "electronic document" is chiefly in an electronicized document state, and to be printed is the "document image" of the electronic document.

The personal computer 110 includes a print instruction unit 111 which gives the print instruction to the print apparatus 130, and an application control unit 112 which controls an application (application software). The print instruction unit 111 instructs to print the electronic document, by employing the tentative ID stated above. Besides, the print instruction from the print instruction unit 111 is given, not only in a case where the electronic document which the personal computer 110 itself has is outputted (transmitted), but also in a case where the document stored in an external electronic-document database (document repository) or the like is specified using, for example, a URL (Uniform Resource Locator). When the print instruction is given, a scale-down/scale-up ratio instruction, an "Nup" instruction, etc. can also be given. In the "Nup" instruction, the number of sheets of the electronic document to be printed on one sheet of medium is designated. Incidentally, the personal computer 110 can also be caused to function as an apparatus which performs, for example, the editing and creation of an electronic document, and the storage management of electronic documents.

Besides, the application control unit 112 opens the document by an existing application as in, for example, the application share of a teleconference system, and it controls the application with the pen type input device 170. More concretely, the application control unit 112 controls the application in such a way that, when a pen designation has been made with the pen type input device 170, an event which is similar to one in the case where the position of the pertinent application has been designated with a mouse and where a mouse button has been pressed is sent to the application. By way of example, when a specified place on the medium is tapped with the pen type input device 170, the application control unit 112 can function so as to send the application the same event as in a case where the left button of the mouse has been clicked as to that position of the window of the application which corresponds to the position on the medium.

By the way, in the example shown in FIG. 1, the print instruction and the application are carried out by the identical personal computer 110, but PCs may well be separately employed for the print instruction and for the application.

The print apparatus 130 includes a communication unit 131 which transmits/receives data to and from external devices, and an address generation unit 132 which generates serial address information for the print on the medium (print medium). Besides, it includes a pattern storage unit 133 which stores a pattern for use in the code image, in a memory, and an identification information generation unit 134 which generates information uniquely specifying the medium (medium identification information). Further, it includes a code image generation unit 135 which generates the code image by using the pattern that has been read out of the pattern storage unit 133 on the basis of the address generated by the address generation unit 132 and the medium identification information generated and encoded by the identification information generation unit 134. By the way, in a case where the document ID of the electronic document is employed instead of the medium identification information, the code image is generated using the acquired document ID and the address generated by the address generation unit 132.

Further, the print apparatus 130 includes a document image generation unit 136 which generates the document image by expanding the electronic document acquired through the communication unit 131, a print control unit 137 which performs the print control of the generated document image and generated code image, and a print unit (image formation unit) 138 which actually prints the code image and electronic document in accordance with, for example, an electrophotographic scheme.

The communication unit 131 receives the print instruction employing the tentative ID, from the print instruction unit 111 of the personal computer 110, and it acquires the electronic document from the print instruction unit 111, simultaneously with the print instruction. Besides, apart from the timing of the print instruction, the communication unit 131 sometimes acquires the electronic document from the document repository through a network. In the case where the electronic document is acquired from the document repository, the URL contained in the print instruction can be utilized by way of example. The communication unit 131 also has the function of outputting information indicative of the corresponding relation between the tentative ID and the formal ID, information indicative of the corresponding relation between the formal ID and the electronic document, the corresponding information between the address printed on the medium and the formal ID, etc. to the document management apparatus 150 and the personal computer 110 after the print.

The address information which is generated by the address generation unit 132, is position information which is printed on the whole surface of the medium in conformity with the size of this medium that is printed with the document image.

In the pattern storage unit 133, oblique line patterns such as a slash "/" and a backslash "\", and dot patterns, for example, are defined as patterns which are used for the code image.

A printout time (information on the date and hour of the print), for example, can be employed as the information uniquely specifying the medium, among the identification information items which are generated by the identification information generation unit 134. Besides, information with a print counter added to the identification information of the print apparatus 130, for example, can be adopted. Incidentally, the document ID for uniquely specifying the electronic document acquired by the communication unit 131 can also be employed as the identification information which is generated. However, in the case of employing the information uniquely specifying the medium, not the document ID, different code images are generated in a case where the media to be printed differ in spite of the identical electronic document. That is, even in a case where the same page of the identical electronic document has been printed a plurality of copies, identification information items (information items uniquely specifying the media) which differ for the respective media can be offered.

In the code image generation unit 135, the identification information and the address information encoded by error correction, error detection or the like are stored as a two-dimensional code. Besides, using the patterns stored in the pattern storage unit 133, the two-dimensional codes in which the different address information items are stored are arranged in the shape of grids on the image of a print size. Besides, in the print mode, the code image is generated so as to include the address information and the information uniquely specifying the medium, by way of example, whereby the specification of the original document (electronic document) is facilitated.

The print control unit 137 executes a process for superposing the document image generated by the document image generation unit 136 and the code image generated by the code image generation unit 135, and the superposed images are outputted to the print unit 138. On this occasion, the print unit 138 is controlled in accordance with the setting information of a blank space in the case of the print on the medium, the sheet size of the print medium, the number of print copies, etc. Information on the control by the print control unit 137 is sent to the identification information generation unit 134, whereby the log information of the print, for example, can be used as the identification information.

The document management apparatus 150 includes an electronic document management unit 151 which acquires the tentative ID and formal ID of the printed electronic document from the communication unit 131 of the print apparatus 130, and which manages the IDs. Besides, it includes an accumulation unit 152 which accumulates the corresponding relations between the electronic document and the address information and formal ID as indicated by a data structure to be stated later. Further, it includes a pen locus record unit 153 which records a pen locus drawn by a user, and a link process unit 154 which executes any process based on link information set in the electronic document. In a case where the electronic document is offered to the document management apparatus 150, the electronic document whose corresponding relation with the formal ID is maintained is stored in the accumulation unit 152.

Incidentally, the document management apparatus 150 can be disposed in a server which is separate from or identical to the document repository that is connected to the network in order to offer the electronic document.

The pen locus record unit 153 analyzes the locus of the movement of the pen type input device 170 on the basis of the position information contained in the code information, and records the movement information of the pen type input device 170. As will be stated later, however, in a case where the function of analyzing the movement locus is included in the pen type input device 170, the analysis is not made in the pen locus record unit 153, and the movement information inputted from the pen type input device 170 is merely recorded here. Besides, the pen locus record unit 153 performs a control for indicating the movement locus on a display (not shown) disposed in the document management apparatus 150, in superposition on the corresponding document image of the original electronic document. Thus, a stroke drawn on the medium can be visually reproduced on the document image of the electronic document on the display.

The link process unit 154 has the correspondence table of that specified place of the original electronic document in which the link information or the like is set, the URL, a program to be activated, etc. Thus, in a case, for example, where a linked location has been designated with the pen type input device 170, the designation of the link is recognized by the position information analyzed from the code information. Here, a browser is started up on the basis of the correspondence table, and it is permitted, for example, to open the homepage of the designated URL or to activate the designated program.

The pen type input device 170 includes a communication function 171 which communicates with the application control unit 112 of the personal computer 110, and an external device, for example, the communication unit 131 of the print apparatus 130. Besides, it includes a code read function 172 which reads and analyzes the code information, an address detection function 173 which detects the address consisting of, for example, an X-coordinate and a Y-coordinate, from the two-dimensional code of the printed medium, and a print apparatus identification function 174 which identifies the print apparatus 130 from the medium identification information, for example, contained in the two-dimensional code of the medium.

The communication function 171 transmits the read code information on the medium, etc. Considered for the communication is a connection to the interface of the USB (Universal Serial Bus) or the like, through a cable, or a connection by a radio LAN, the RS-232C being a serial interface standard, the "Bluetooth" being a short-distance radio transmission technique, or the like.

FIGS. 2A to 2C are diagrams for explaining the two-dimensional code image which is generated by the code image generation section 135 of the print apparatus 130, and which is printed by the print unit 138. FIG. 2A is the diagram in which the units of the two-dimensional code image formed and arranged by an invisible image are expressed in the shape of grids as a schematic illustration. Besides, FIG. 2B is the diagram showing one unit of the two-dimensional code image as which the invisible image is recognized by infrared irradiation. Further, FIG. 2C is the diagram for explaining the oblique line patterns of the backslash "\" and the slash "/".

The two-dimensional code image which is formed by the print unit 138 is formed using, for example, a so-called "invisible toner" whose maximum absorption factor in a visible radiation region (400 nm-700 nm) is, for example, 7% or below, and whose absorption factor in a near-infrared region (800 nm-1000 nm) is, for example, 30% or above. Besides, the invisible toner to be adopted should have mean variance diameters within a range of 100 nm-600 nm, in order to heighten a near-infrared radiation absorbability necessary for the machine reading of the image. Here, the "visible" and "invisible" conditions do not concern if the image can be recognized by eye inspection. These "visible" and "invisible" conditions are distinguished depending upon if the image formed on the printed medium can be recognized in accordance with the presence or absence of a color developing property based on the absorption of a specified wavelength in the visible radiation region. Incidentally, the formation of the image which is formed using the invisible toner (the invisible image) is detailed in JP-A-2003-186238.

The two-dimensional code image shown in FIGS. 2A to 2C is formed of the invisible image which can be subjected to the machine reading based on the infrared irradiation and to an encoding process, stably for a long term, and which can record information at a high density. Besides, it is favorable that the invisible image can be provided at any desired region irrespective of that region of the front surface of the medium for outputting the image which is provided with the visible image. In this embodiment, the invisible image is formed on the whole area of one medium surface (paper surface) in conformity with the size of the medium to-be-printed. Besides, it is more favorable that the invisible image can be recognized by, for example, a luster difference in the eye inspection.

The two-dimensional code pattern shown in FIG. 2B includes a region where a position code (a code corresponding to the address information), and a region where an identification code for uniquely specifying the print medium (a code corresponding to the second identification information) is stored. Also, it includes regions where synchronization codes are stored. Besides, as shown in FIG. 2A, a plurality of such two-dimensional code patterns are arranged, and two-dimensional codes in which different address information items are stored are arranged in the shape of the grids on the whole area of one medium surface (paper surface) in conformity with the size of the medium to-be-printed. That is, the plurality of two-dimensional code patterns each being as shown in FIG. 2B are arranged on one medium surface, and each of them includes the identification code, the position code and the synchronization codes. Here, the position information items which are respectively different depending upon arrangement places are stored in the regions of the plurality of position codes. In contrast, the identification information which is identical irrespective of arrangement places is stored in the regions of the plurality of identification codes. Each position code is arranged in a rectangular region of, for example, 6 bits×6 bits.

Individual bit values are formed of a plurality of minute line bit maps of different rotational angles, and a bit value "0" and a bit value "1" are respectively expressed by the oblique line patterns (pattern "0" and pattern "1") shown in FIG. 2C. More concretely, the bit "0" and the bit "1" are expressed using the backslash "\" and the slash "/" which have inclinations different from each other. Each oblique line pattern is formed having a size of 8×8 pixels at 600 dpi, and the oblique line pattern rising leftward (pattern "0") expresses the bit value "0", while the oblique line pattern rising rightward (pattern "1") expresses the bit value "1". Accordingly, information of one bit ("0" or "1") can be expressed by one oblique line pattern. Using the minute line bit maps which have such inclinations of two sorts, it is permitted to offer the two-dimensional code patterns which exert very little noise on the visible image, and with which a large quantity of information items can be digitized and embedded at a high density.

The position information items totaling 36 bits are stored in the position code region shown in FIG. 2B. Among the 36 bits, 18 bits can be used for encoding the X-coordinate, and the remaining 18 bits for encoding the Y-coordinate. When all the pairs of 18 bits are used for encoding positions, $2^{18}$ (about 260 thousand) positions can be encoded. In the case where each oblique line pattern is formed of 8 pixels×8 pixels (600 dpi) as shown in FIG. 2C, one dot of 600 dpi is 0.0423 mm long, and hence, the size of the two-dimensional code (including the synchronization codes) in FIG. 2B becomes about 3 mm (8 pixels×9 bits×0.0423 mm) in both length and width. In case of encoding 260 thousand positions at intervals of 3 mm, a length of about 786 m can be encoded. All of the 18 bits can be used for the encoding of the positions in this manner, or a redundant bit for error detection or error correction may well be included in the 18 bits in such a case where the detection errors of the oblique line patterns occur.

The identification code is arranged in a rectangular region of 2 bits×8 bits and 2 bits×6 bits, and it can store the identification information totaling 28 bits. In case of using the 28 bits as the identification information, about 270 million ($2^{28}$) identification information items can be expressed. Likewise to the position code, the identification code can include a redundant bit for error detection or error correction, in the 28 bits.

Figure 3:
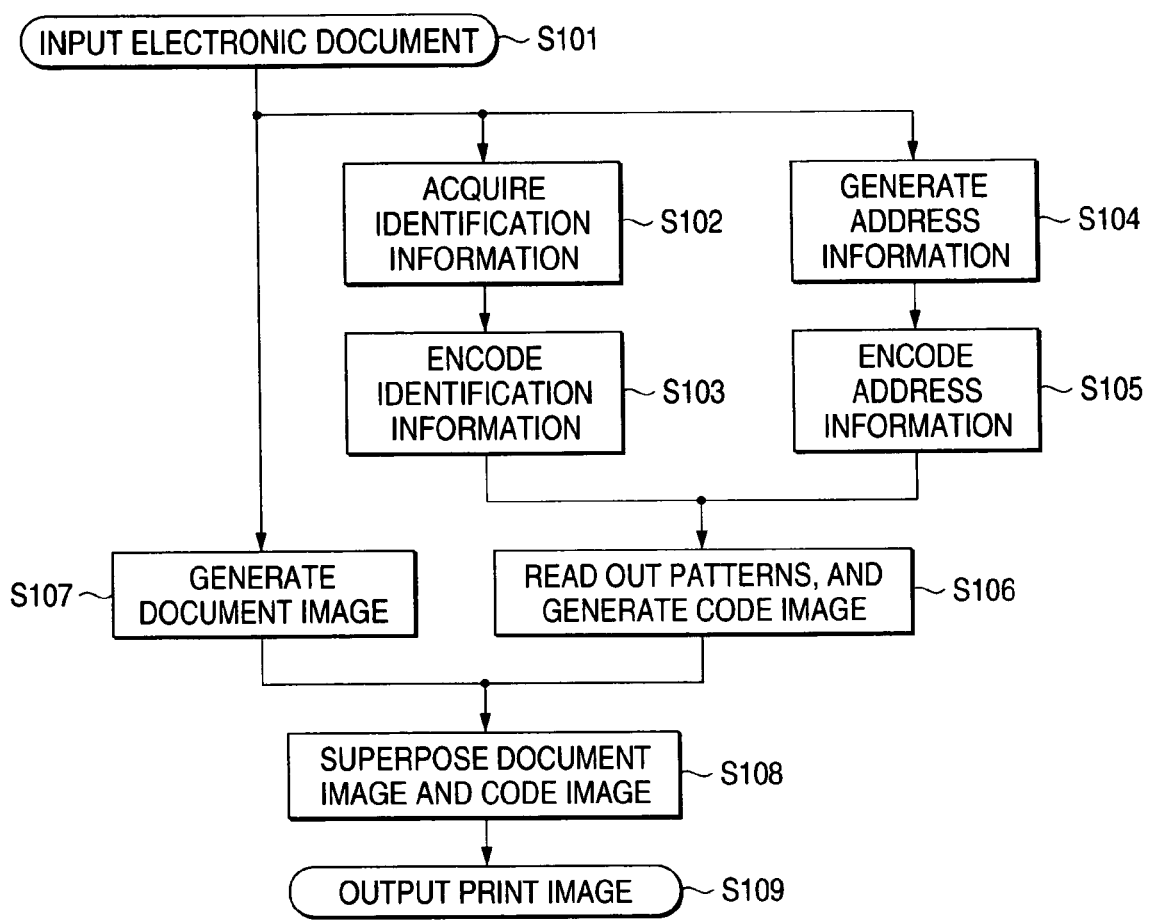
FIG. 3 is a flow chart showing the process of address embedment which is executed by the print apparatus shown in FIG. 1.

FIG. 3 is a flow chart showing the process of address embedment which is executed by the print apparatus 130 shown in FIG. 1. The communication unit 131 of the print apparatus 130 inputs an electronic document in compliance with an instruction which employs a tentative ID (first identification information) and which is sent from the print instruction unit 111 of the personal computer 110 (step 101). The electronic document which is inputted is sometimes received together with the print instruction from the print instruction unit 111 of the personal computer 110. Besides, the electronic document is sometimes acquired from, for example, the document repository connected to the network, through the designation of a URL. Further, the electronic document is sometimes one which is accumulated in an electronic document accumulation unit (not shown) within the print apparatus 130.

The code image generation unit 135 having acquired the input information of the electronic document from the communication unit 131 acquires identification information (second identification information) such as medium identification information generated by the identification information generation unit 134 or the document ID of the electronic document as inputted together with this electronic document (step 102). Besides, the code image generation unit 135 encodes the acquired identification information items in accordance with a predetermined encoding scheme (step 103). On the other hand, the address generation unit 132 having acquired the input information of the electronic document from the communication unit 131 generates serial address information (position information) which is to be printed on the whole surface of a medium in conformity with the size of the medium to-be-printed (step 104). Besides, the address generation unit 132 encodes the generated address information (position information) in accordance with a predetermined encoding scheme (step 105). In the acquisition of the address information as proceeds at the step 104, addresses are generated in conformity with the size of the medium specified in the print instruction, for example, the A4-size, A3-size, B5-size or B4-size. Besides, in case of enlarging or reducing the inputted electronic document, the addresses for the medium change with the enlargement or reduction. Further, the encoding processing of the step 105 proceeding in the address generation unit 132 can employ, for example, the RS (Reed-Solomon) code or the BCH code which is a known error correcting code. Also, as an error detection code, the CRC (Cyclic Redundancy Check) or check sum value of the position information can be computed so as to affix the value to the position information as a redundant bit. Incidentally, that encoding of the identification information which is executed by the identification information generation unit 134, and that encoding of the address information (position information) which is executed by the address generation unit 132 can adopt the same encoding scheme.

Thereafter, in the code image generation unit 135, patterns are read out of the pattern storage unit 133, while a code image is generated using the encoded identification information and the encoded address information (position information), and they are arranged in two dimensions (step 106). More specifically, the encoded address information (encoded position information) and the encoded identification information which are arranged in the two dimensions are combined, thereby to generate a two-dimensional code array which corresponds to an output image size. On this occasion, codes obtained by encoding the address information items which are different depending upon the arrangement positions are used as the encoded address information, and codes obtained by encoding the identification information items which are identical irrespective of the positions are used as the encoded identification information.

On the other hand, in the document image generation unit 136, the electronic document is imaged, thereby to generate a document image (step 107). Here, in expanding the image in, for example, a page memory, there are performed the operations of converting input color signals of, for example, R (red), G (green) and B (blue) into Y (yellow), M (magenta), C (cyan) and K (black) which are print color signals. Besides, in the print control unit 137, the operation of superposing and imaging the two-dimensional code array generated at the step 106 and the document image generated at the step 107 is performed (step 108), and the resulting print image is outputted to the print unit 138 (step 109). In the print control unit 137 and the print unit 138, the code image is formed using a color material which is not easily identifiable (which is substantially invisible) with the human eye, and the document image is formed using color materials which are identifiable (which are visible) with the human eye. Besides, the invisible color material has the property that the wavelength of a specified infrared region is absorbed more than the wavelength of a visible radiation region, and the visible color materials have the property that the wavelength of the visible radiation region is absorbed more. By the way, in this embodiment, the utilization of the invisible color material has been exemplified, but this is not restrictive. It is also possible, for example, to form a code image part by using carbon black which absorbs the wavelength of an infrared region, and to form a document image part by using color materials of yellow, magenta and cyan (usually, these color materials are small in the quantity of absorption of the wavelength of the infrared region).

Figure 4:
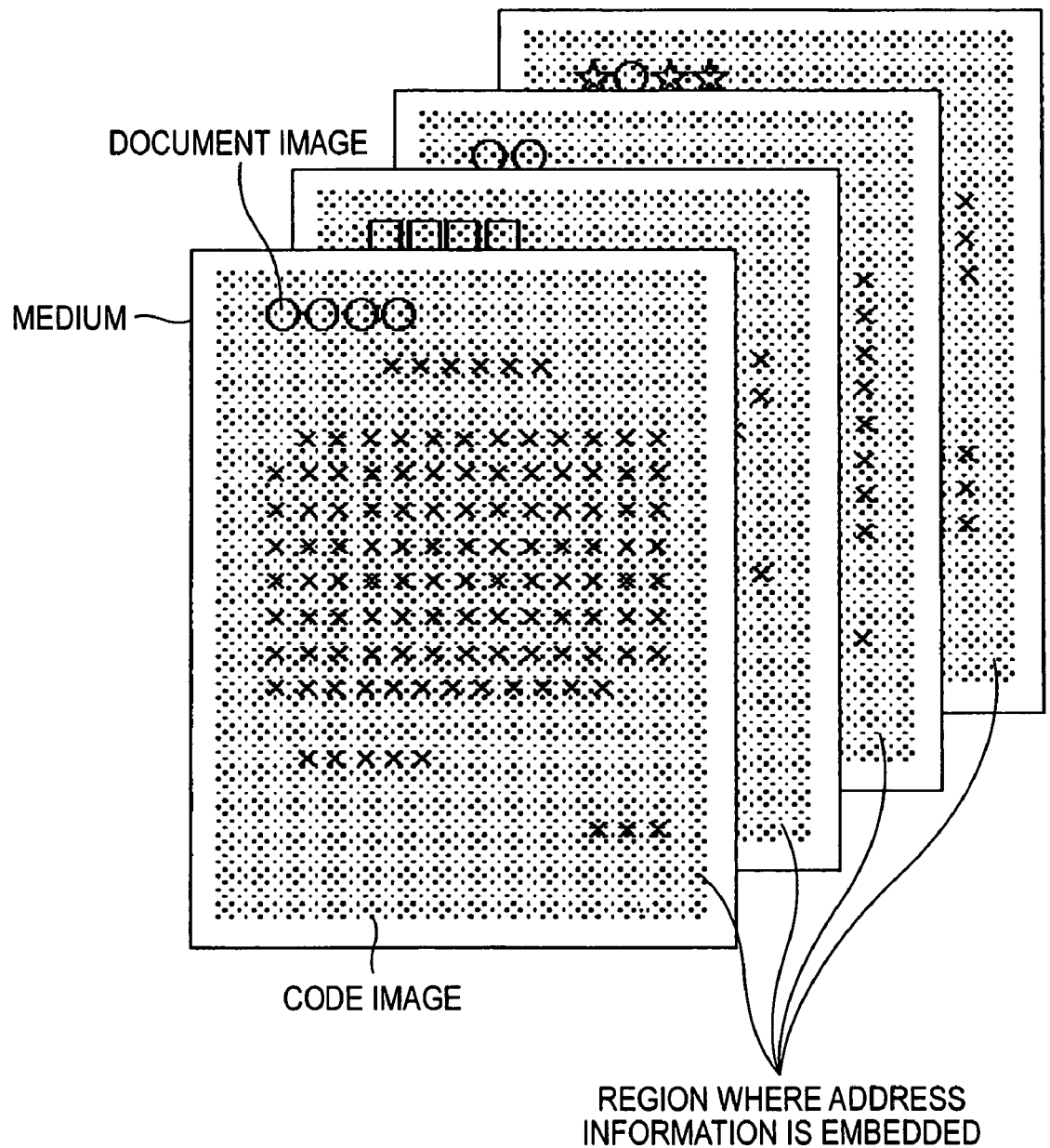
FIG. 4 is a diagram showing examples of a print image which contains the code image.

FIG. 4 is a diagram showing examples of the print image containing the code image as has been obtained in the above way. As shown in FIG. 4, the code image printed using an invisible toner is superposed on the document image formed using visible toners, and they are outputted on the front surface of the medium (image output medium). Owing to the code image, a region where the address information is embedded is formed. As stated before, the address information is allocated to the whole surface of the medium in conformity with the size of this medium to-be-printed, and the code image which expresses the address information is formed on the whole area of one medium surface. By the way, in a case where the medium identification information (information uniquely specifying the medium) is employed as the identification information contained in the code image, it become different every medium. That is, in spite of the identical electronic document, different identification information is affixed every page or every copy in a case where a plurality of pages or a plurality of copies have been printed, and the content of the code image differs every medium even in a case where the document image of the identical electronic document has been printed. On the other hand, as the address information (position information) contained in the code image, it is possible to employ information which is identical for all jobs, all pages, all media, etc. In the case where the identification information contained in the code image is the information uniquely specifying the medium, a finite number of addresses in the case of, for example, the Anoto functionality provided by Anoto Nippon K. K. need not be allocated. Moreover, since the finite number of addresses need not be allocated, various processes within the system as concern the allocation of the addresses can be sharply decreased.

Next, there will be described the practicable configuration of the print unit 138 which is an image formation apparatus.

Figure 5:
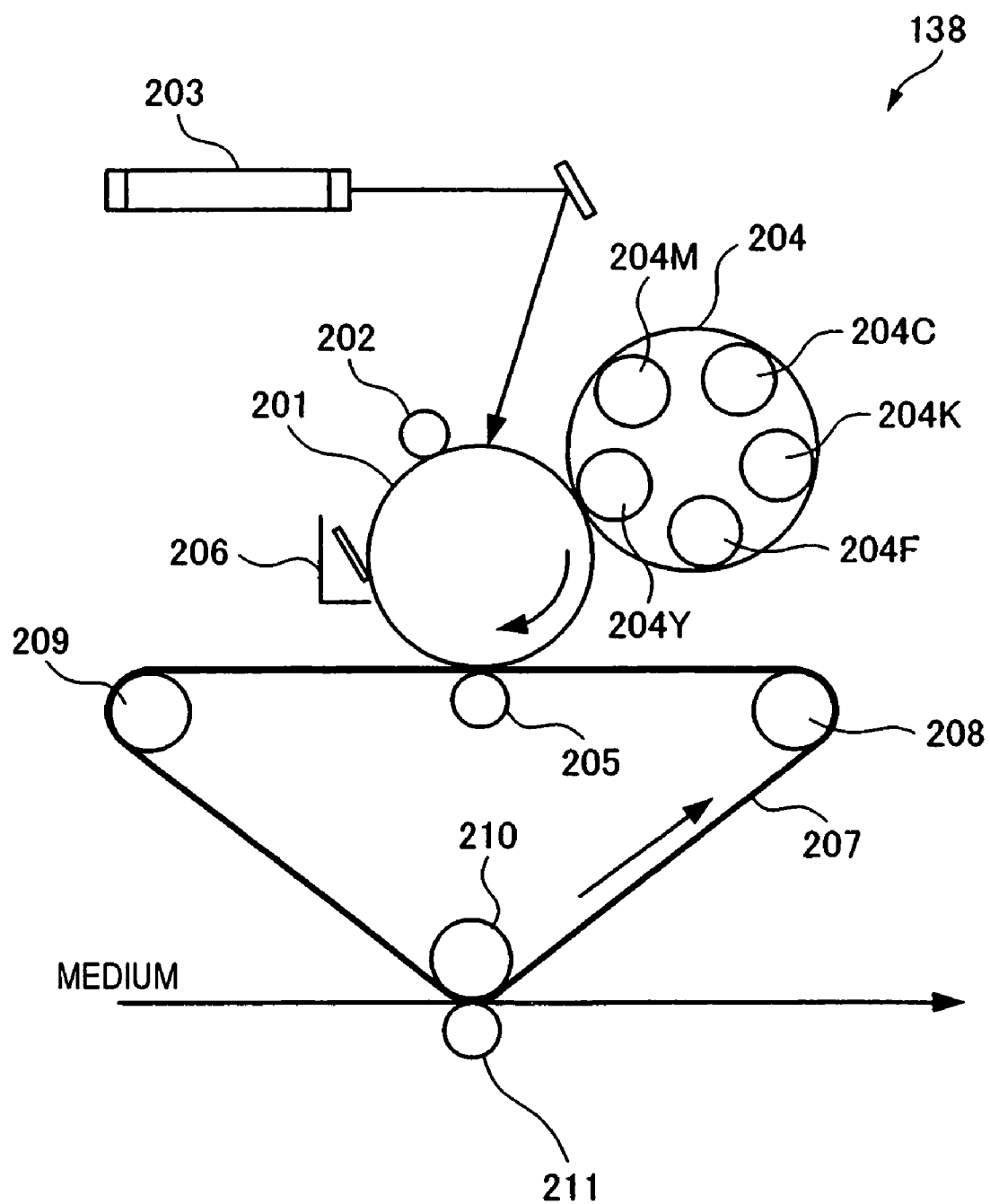
FIG. 5 is a schematic view showing a configurational example of a print unit which simultaneously forms an invisible image together with a visible image in accordance with this embodiment.

FIG. 5 is a schematic view showing a configurational example of the print unit (image formation unit) 138 which simultaneously forms an invisible image together with a visible image in accordance with this embodiment. The print unit 138 shown in FIG. 5 is configured including an image carrier 201, an electric charger 202, an exposure device 203, a rotary development device 204, a primary transfer roll 205, a cleaning device 206, an intermediate transfer belt 207, support rolls 208 and 209 for the intermediate transfer belt 207, and an opposition roll 210 and a secondary transfer roll 211 which are disposed in a secondary transfer section.

The image carrier 201 is a photosensitive drum which includes a photosensitive layer at its outer peripheral surface. This image carrier 201 is disposed so as to be rotatable in the direction of an arrow indicated in FIG. 5. The charger 202 uniformly charges the surface of the image carrier 201. The exposure device 203 projects, for example, a laser beam onto the surface of the image carrier 201 uniformly charged by the charger 202, thereby to form an electrostatic latent image. The rotary development device 204 has five development units 204F, 204Y, 204M, 204C and 204K which accommodate toners for an invisible image, for yellow, for magenta, for cyan and for black, respectively. Since, in the apparatus shown in FIG. 5, the toners are employed as developing agents for image formation, the invisible toner is accommodated in the development unit 204F, the yellow color toner in the development unit 204Y, the magenta color toner in the development unit 204M, the cyan color toner in the development unit 204C, and the black color toner in the development unit 204K. The rotary development device 204 shifts the toners onto the electrostatic latent images corresponding to the respective colors and forms visible toner images and an invisible toner image, by being driven to rotate so that the five development units 204F, 204Y, 204M, 204C and 204K may approach and oppose to the image carrier 201 in succession.

The primary transfer roll 205 holds the intermediate transfer belt 207 between it and the image carrier 201, and it primarily transfers the toner image (visible toner image or invisible toner image) formed on the surface of the image carrier 201, onto the outer peripheral surface of the intermediate transfer belt 207. The cleaning device 206 removes the toner remaining on the surface of the image carrier 201 after the primary transfer (or cleans the image carrier). The intermediate transfer belt 207 has its inner peripheral surface extended by the plurality of support rolls 208 and 209 and the opposition roll 210, and it is supported so as to be capable of turning round in the direction of an arrow. The secondary transfer roll 211 secondarily transfers the toner image transferred on the outer peripheral surface of the intermediate transfer belt 207, onto a medium (a sheet of paper) which is conveyed in the direction of an arrow by a sheet-of-paper conveyance unit not shown.

In the print unit 138 thus configured, the toner images are successively formed on the surface of the image carrier 201, and they are transferred in multiple fashion onto the outer peripheral surface of the intermediate transfer belt 207. More specifically, first of all, the image carrier 201 is driven to rotate, and the surface of the image carrier 201 is uniformly charged by the charger 202. Thereafter, image light based on the exposure device 203 is projected onto the image carrier 201 so as to form the electrostatic latent image. At the electrostatic-latent image formation step here, the invisible toner image is first formed. After the electrostatic latent image has been developed by the development unit 204F for the invisible image, the toner image is transferred onto the outer peripheral surface of the intermediate transfer belt 207 by the primary transfer roll 205. The invisible toner which remains on the surface of the image carrier 201 without being transferred onto the intermediate transfer belt 207 at this time, is removed by the cleaning device 206. Thereafter, the intermediate transfer belt 207 formed with the invisible toner image on its outer peripheral surface stands-by at a position where the next toner image of the yellow color is to be stacked and transferred onto the invisible toner, while holding the invisible toner image on the outer peripheral surface. Thenceforth, the steps of charging by the charger 202, projecting the image lights by the exposure device 203, forming the toner images by the corresponding development units 204M, 204C and 204K, and transferring the toner images onto the outer peripheral surface of the intermediate transfer belt 207 are successively repeated for the respective colors of magenta, cyan and black and likewise to the above.

In this way, both the toner images of the invisible toner image and a full-color toner image (visible toner image) consisting of the toner images of the four colors are borne on the outer peripheral surface of the intermediate transfer belt 207. The full-color visible toner image and the invisible toner image are collectively transferred onto the medium (sheet of paper) by the secondary transfer roll 211. Thus, a recorded image in which the full-color visible image and the invisible image coexist is obtained on the image formation surface of the medium. Owing to the sequence of the primary transfer steps, the invisible image is formed at the uppermost layer of the medium. Therefore, the invisible image as which the code images as shown in FIG. 2 have been printed is formed on the visible image as which the document image has been printed, and in reading the invisible image as will be stated later, the existence of the visible image does not hamper the reading. Incidentally, the full-color visible image is sometimes replaced with, for example, a monaural-color visible image of black and white or a plus-one-color visible image in which one other color is added. As thus far described, the visible image and the invisible image are simultaneously formed.

Next, there will be described a data structure which is accumulated in the accumulation unit 152 in FIG. 1.

FIG. 6 is a diagram showing an example of a data structure which manages the correspondence between an electronic document and address information and the correspondence between the electronic document and a formal ID (second identification information), and it shows content examples which are accumulated in the accumulation unit 152. The data structure shown in FIG. 6 is itemized into a management ID, an electronic document name, page information, a service address (start), a service address (end), a printout time, an electronic document size, a paper size, a scale-down/scale-up ratio (%) and "Nup" information, and it manages the corresponding relations of the items. Here, the printout time is employed as the formal ID. The management IDs "1"-"6" indicate a case where an electronic document formed of an identical image has been printed 6 pages. Accordingly, the electronic document name becomes an identical URL for all of the management IDs "1"-"6", and the page information becomes "1"-"6". Besides, at the management IDs "7" and "8", an electronic document formed of an identical image has been printed 2 pages in succession, and the page information becomes "1" and "2". Likewise, at the management IDs "9" and "10", an electronic document formed of an identical image has been printed 2 pages in succession, and the page information becomes "1" and "2".

With the data structure shown in FIG. 6, the service addresses are allocated in conformity with the size of a sheet of paper to which a document image is outputted. By way of example, 60900 addresses are allocated per sheet for the paper size of the A4 format, and 121800 (182700-60900) addresses are allocated per sheet for the paper size of the A3 format (refer to the management ID "8"). The respective service addresses are reset every electronic document. In the example shown in FIG. 6, therefore, the service addresses are allocated for 6 sheets of paper of the A4 format (365400 addresses) at the management IDs "1"-"6", whereupon the service addresses are reset at the management ID "7" for printing the document image of the next electronic document, and they are started from the first. Likewise, the service addresses totaling 182700 addresses are allocated for one sheet of paper of the A4 format and one sheet of paper of the A3 format at the management IDs "7" and "8", whereupon the service addresses are reset at the management ID "9" for printing the document image of the next electronic document, and they are started from the first. Here, at the management IDs "9" and "10", the "Nup" information is "2", and the document images of two electronic documents are printed on one sheet of paper. Therefore, the document image the electronic document size of which is the A3 size is printed on the sheet of the paper size A4, and it is handled in the same manner as in a case where its scale-down/scale-up ratio has become 70%. As the service addresses on this occasion, although the electronic document size is equivalent to the A3 size, 60900 addresses are allocated per sheet in conformity with the paper size for the print.

In the example shown in FIG. 6, the printout time is employed as the formal ID (second identification information). This printout time is special every medium in the print apparatus 130, with the result that it can uniquely specify the medium. The printout time is contained in the code image as the identification information, so that, for example, medium IDs which are individually allocated by a predetermined management server or the like need not be employed. Besides, the medium specification information is quite different in character from the document ID of the electronic document. In a case, for example, where the document image of an identical electronic document is printed a plurality of copies or where the document images of an electronic document over a plurality of pages are printed on one medium sheet as in the "Nup" mode, the pages of the electronic document and individual media cannot be matched at all with the electronic document ID. In this embodiment, the information uniquely specifying the medium is printed so as to be contained in the code image, whereby the print media can be individually identified, and the electronic documents can be managed in medium units, so that the management system being much superior to the prior art can be provided. Incidentally, when medium specification information is set by combining the printout time with an apparatus ID which identifies the print apparatus 130, a finite address space as provided by, for example, Anoto Nippon K. K. need not be allocated beforehand.

By the way, as medium specification information, it is also possible to employ the combination between the apparatus ID which identifies the print apparatus 130 and the information of a count content which is incremented every print of one sheet, by the counter (not shown) of the print apparatus 130. The combination between the apparatus ID and the count content is excellent in the points that the management of the printout times is dispensed with, and that an information quantity for use in the code image can be decreased.

Also, it is possible to use the document ID which the electronic document has, without employing any medium specification information as the formal ID (second identification information). In such a case, the information of the document ID is stored instead of the printout time.

Next, the pen type input device 170 will be described.

Figure 7:
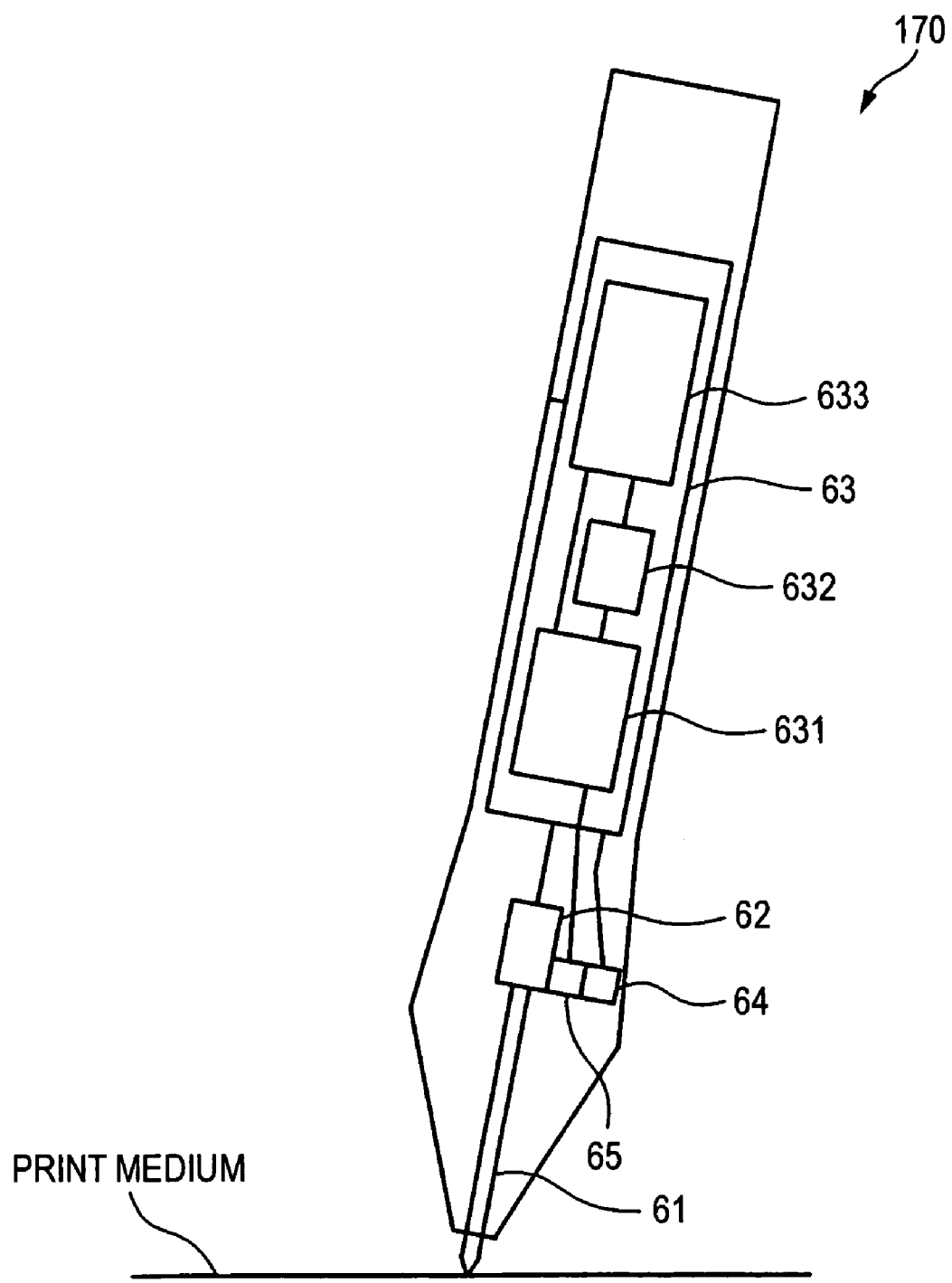
FIG. 7 is a view showing the configuration of a pen type input device.

FIG. 7 is a view showing the configuration of the pen type input device 170. Although the pen type input device 170 has been illustrated in FIG. 1, chiefly on the function which is used for the communication with the external equipment, FIG. 7 shows the general configuration of the hardware of the pen type input device 170 as includes the function of reading an invisible image, etc. The pen type input device 170 includes a handwriting portion (pen point) 61 with which a character or a pattern is recorded by a manipulation similar to that of an ordinary pen, on a sheet of paper (print medium) printed with a code image and a document image that have been composited, and a writing-pressure detection portion 62 which is constructed of a writing-pressure sensor for monitoring the movement of the handwriting portion 61 so as to detect that the pen type input device 170 is pressed against the sheet of paper. Besides, the pen type input device 170 includes a control portion 63 which is incarnated by an integrated circuit on a substrate and which controls the electronic operation of the whole pen type input device 170, an infrared projection portion 64 which projects infrared radiation in order to read the code image on the sheet of paper, and an image input portion 65 which grasps the code image irradiated with the infrared radiation, so as to input the code image.

Here, the control portion 63 will be described in more detail.

The control portion 63 includes a code acquisition portion 631, a locus calculation portion 632 and an information storage portion 633. The code acquisition portion 631 is a portion in which the code read function 172 shown in FIG. 1 is embodied as hardware, and which analyzes the image inputted from the image input portion 65, so as to acquire a code. The locus calculation portion 632 is a portion which corrects the deviation between the coordinates of the pen point of the handwriting portion 61 and the coordinates of the image grasped by the image input portion 65, for the code acquired by the code acquisition portion 631, so as to calculate the locus of the pen point. The information storage portion 633 is a portion which stores therein the code acquired by the code acquisition portion 631, and the locus information calculated by the locus calculation portion 632.

Figure 8:
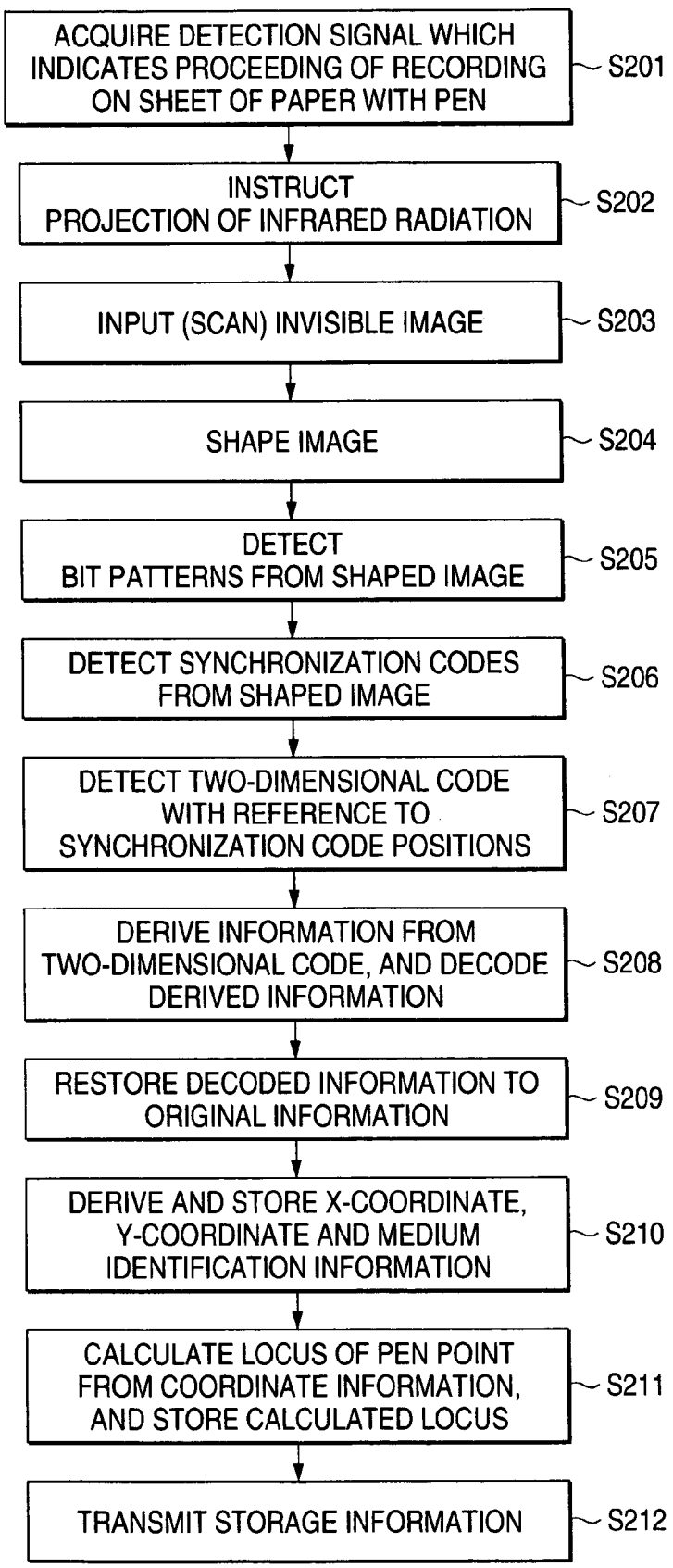
FIG. 8 is a flow chart showing a process which is chiefly executed by the control portion of the pen type input device.

FIG. 8 is a flow chart showing a process which is mainly executed by the control portion 63 of the pen type input device 170. When the pen type input device 170 is used for recording a character or a pattern on a print medium (sheet of paper) by way of example, the control portion 63 acquires from the writing-pressure detection portion 62, a detection signal which indicates the proceeding of the recording on the sheet of paper with the pen (step 201). Upon detecting the detection signal, the control portion 63 instructs the infrared projection portion 64 to project infrared radiation onto the sheet of paper (step 202). The infrared radiation projected onto the sheet of paper by the infrared projection portion 64 is absorbed by the invisible image. The image input portion 65 grasps the code image irradiated with the infrared radiation. The control portion 63 inputs (scans) the invisible image through the image input portion 65 (step 203). Thereafter, code image detection processing indicated at steps 204-210 is executed in the code acquisition portion 631 of the control portion 63. Here, first of all, the inputted scan image is shaped (step 204). The shaping of the scan image includes a slope correction, noise removal, etc. Besides, bit patterns (oblique line patterns) such as a slash "/" and a backslash "\" are detected from the shaped scan image (step 205). On the other hand, synchronization codes which are codes for positioning a two-dimensional code are detected from the shaped scan image (step 206). The code acquisition portion 631 detects the two-dimensional code with reference to the positions of the synchronization codes (step 207). Besides, information such as an ECC (Error Correcting Code) is derived from the two-dimensional code and is decoded (step 208). Further, the decoded information is restored to the original information (step 209).

Figure 9B:
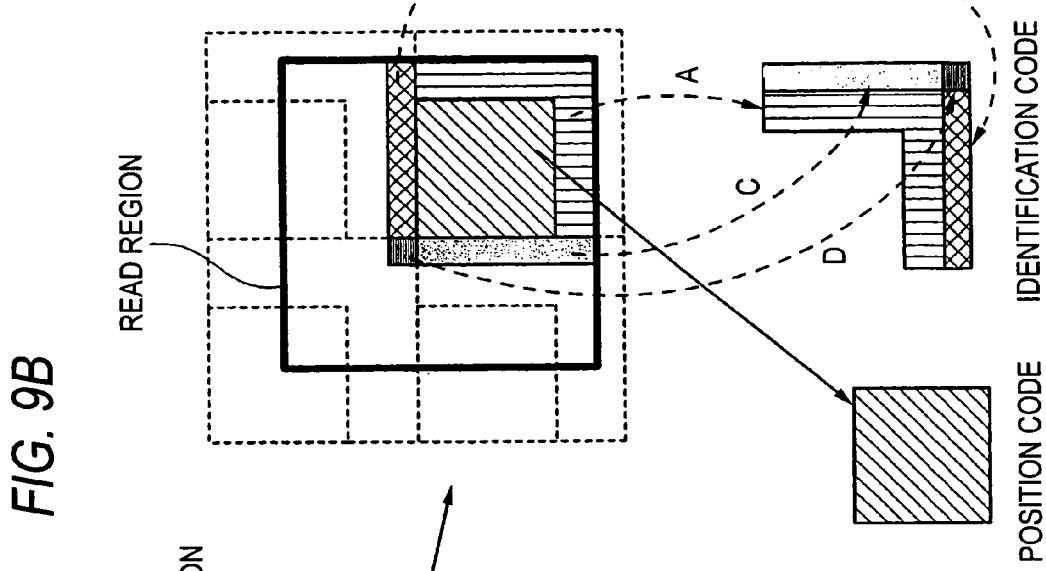
FIGS. 9A and 9B are diagrams for explaining the reading of code information in the pen type input device.
Figure 9A:
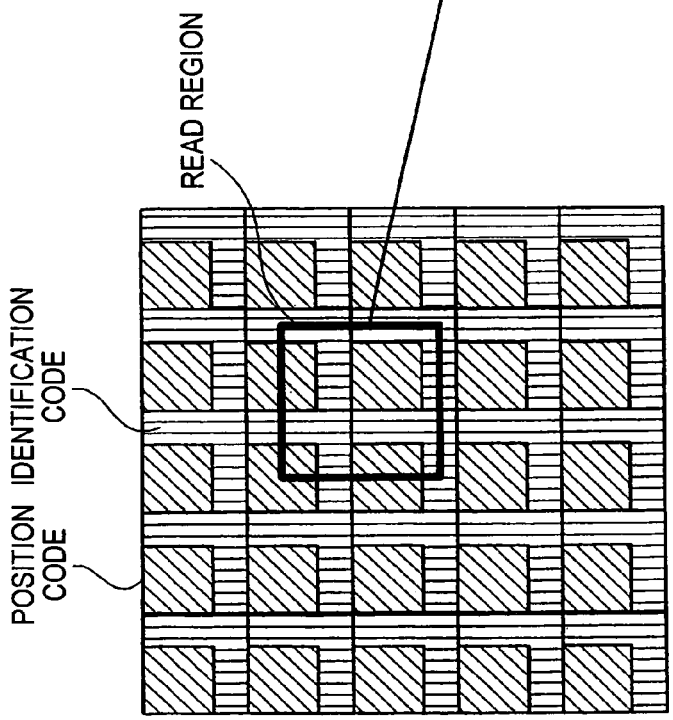

FIGS. 9A and 9B are diagrams for explaining the reading of code information in the pen type input device 170. As shown in FIG. 9A, a plurality of position codes (codes corresponding to the address information) and a plurality of identification codes (codes corresponding to the identification information) are respectively arranged in two dimensions on, for example, the medium printed by the print apparatus 130. Incidentally, for the brevity of description, the synchronization codes are omitted from illustration in FIG. 9A. As stated before, the plurality of position codes store the position information items which are respectively different depending upon their arrangement places, and the plurality of identification codes store the identification information items which are identical irrespective of their arrangement places. It is now assumed that the read region of the invisible image to be read by the image input portion 65 is indicated by a thick line in FIG. 9A. Shown in FIG. 9B is the diagram in which the vicinity of the read region is enlarged. Since the position codes store the information items which differ depending upon the positions within the image, the position code cannot be detected unless at least one position code is contained in the read image without fail. In contrast, since the identification codes store the identification information items all of which are identical irrespective of the positions within the image, the identification code can be restored from fragmentary information. In the example shown in FIG. 9B, one identification code is restored by combining four partial codes (A, B, C and D) which lie in the read region.

In the code acquisition portion 631 of the control portion 63, an X-coordinate, a Y-coordinate and medium identification information are derived from the code information restored in the above way, and the derived address information and medium identification information are stored in the information storage portion 633 (step 210). On the other hand, the locus calculation portion 632 calculates the locus of the pen point from the coordinate information stored in the information storage portion 633, and it stores the calculated locus in the information storage portion 633 (step 211). Storage information items such as the identification information, address information and locus information, which are stored in the information storage portion 633, are transmitted to the external equipment by wire or radio, through the communication function shown in FIG. 1 (step 212).

The storage information items thus transmitted from the pen type input device 170 are processed by, for example, the application control unit 112 of the personal computer 110. By way of example, handwriting information based on the pen type input device 170 is reflected on electronic information specified by the identification information, and the information items are composited and indicated on a display not shown. Besides, the handwriting information can be stored as, for example, the revision information of the original electronic document stored in the document repository. Further, in a case where, after handwriting has been once done, handwriting is done at another chance again, it is effective that the revision information is read out in addition to the original electronic document, and that new handwriting information is added to the electronic document containing the revision information.

Next, there will be described a process employing a tentative ID (print instruction specification information) and a formal ID (specification information specifying a printed electronic document or print medium) as is the most important feature in this embodiment.

FIGS. 10A to 10D are views showing processing patterns in the case where the technique of a print instruction employing the tentative ID is adopted.

Figure 10A:
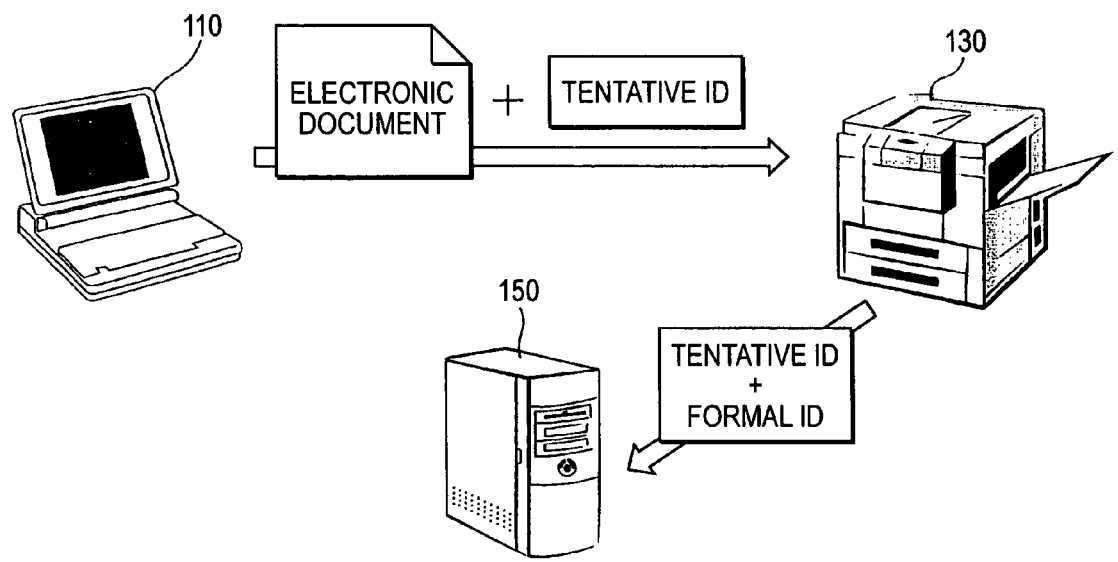
FIGS. 10A and 10B are views showing processing patterns in the case where the technique of a print instruction employing a tentative ID is adopted.

First, in FIG. 10A, the electronic document and the tentative ID (print instruction specification information, or first identification information) are transmitted from the personal computer (PC) 110 to the print apparatus 130. The print apparatus 130 which has received the electronic document and the tentative ID, creates the formal ID (specification information specifying the printed electronic document or print medium, or second identification information) and prints information on the formal ID, onto the print medium. Thereafter, the print apparatus 130 transmits information on the corresponding relation between the tentative ID and the formal ID, to the document management apparatus 150.

Figure 10B:
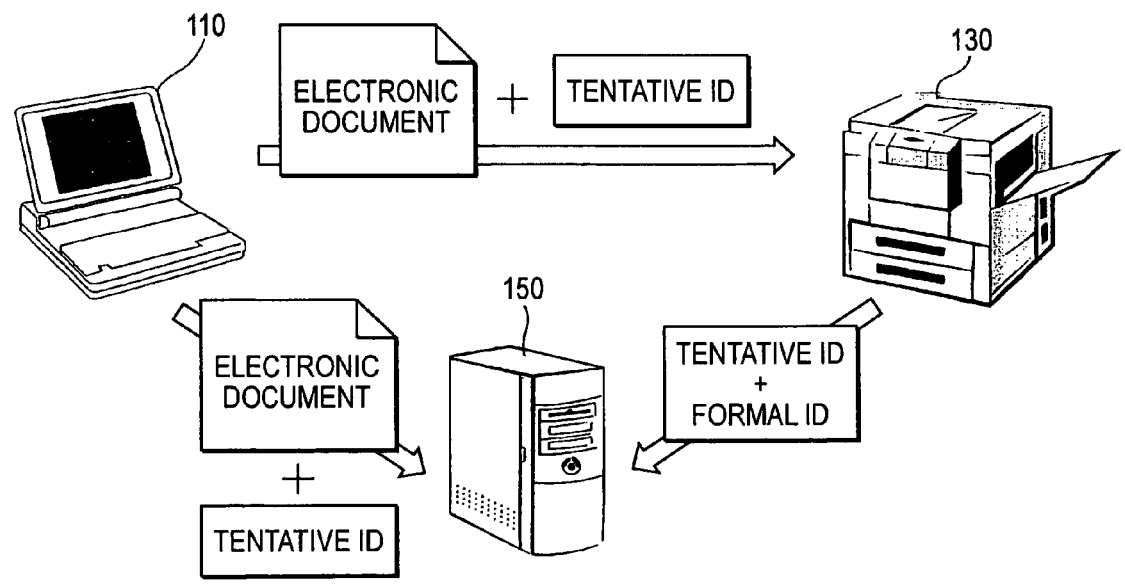

In FIG. 10B, the tentative ID and the electronic document are transmitted from the personal computer (PC) 110 to the document management apparatus 150, in addition to the configuration shown in FIG. 10A. In the document management apparatus 150, the corresponding relation between the formal ID and the electronic document can be grasped from the corresponding relation between the formal ID and the tentative ID as received from the print apparatus 130, and the corresponding relation between the electronic document and the tentative ID as received from the personal computer (PC) 110. Here in the document management apparatus 150, the grasped corresponding relation between the formal ID and the electronic document is stored in the accumulation unit 152 shown in FIG. 1, in conformity with the data structure as shown in FIG. 6. Thus, the document management apparatus 150 can collectively manage the relations between the printed results of electronic documents in the print apparatus 130 and the identification information items (formal IDs) identifying the electronic documents printed on media and or the media themselves. Besides, an application which uses the pen type input device 170 or the like is permitted to utilize the print medium printed by the print apparatus 130. Incidentally, at the time when the corresponding relation between the formal ID and the electronic document has been grasped, the role of the tentative ID ends, and the information of the tentative ID is abolished.

Figure 10C:
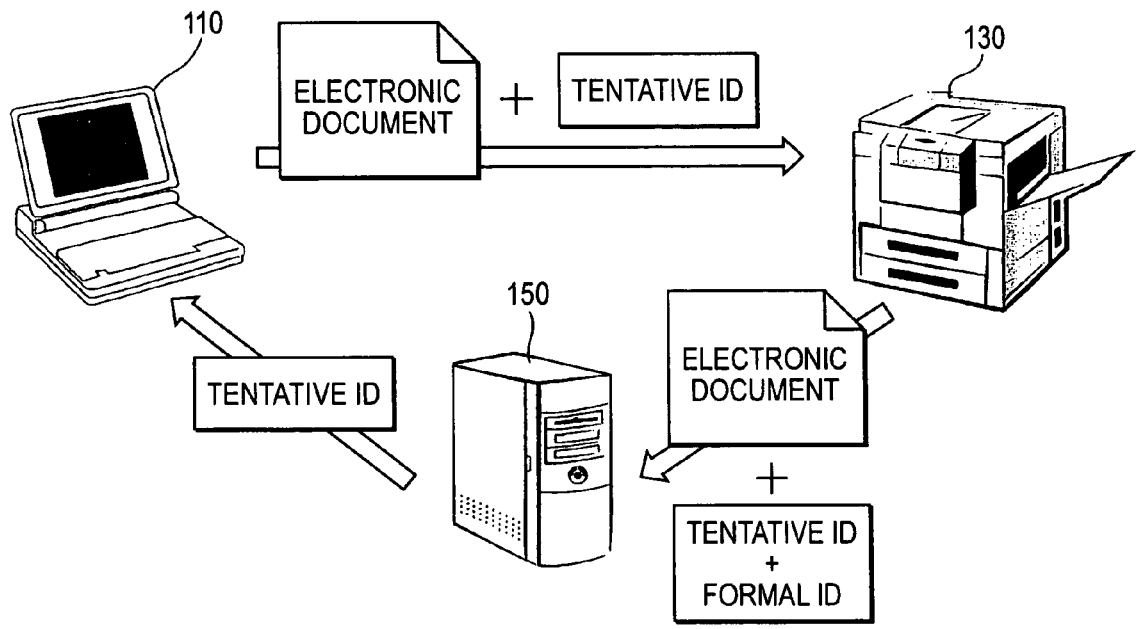
FIGS. 10C and 10D are views showing other processing patterns in the case where the technique of a print instruction employing the tentative ID is adopted.

In FIG. 10C, the electronic document and the tentative ID are transmitted from the personal computer (PC) 110 to the print apparatus 130. In the print apparatus 130 which has received the electronic document and the tentative ID, the formal ID is created, and information on the formal ID is printed onto the print medium. The processing thus far described is the same as in FIG. 10A or 10B. Here in FIG.

10C, not only the information on the corresponding relation between the tentative ID and the formal ID, but also the electronic document used in the printing is transmitted from the print apparatus 130 to the document management apparatus 150. The document management apparatus 150 which has received the tentative ID as well as the formal ID and the electronic document can store the corresponding relation between the formal ID and the electronic document, in the accumulation unit 152 shown in FIG. 1, in conformity with the data structure as shown in FIG. 6. Thereafter, the document management apparatus 150 transmits the tentative ID to the personal computer (PC) 110. The personal computer (PC) 110 having received the tentative ID can recognize that the electronic document as to which a print instruction bearing the tentative ID was given has been printed by the print apparatus 130.

Figure 10D:
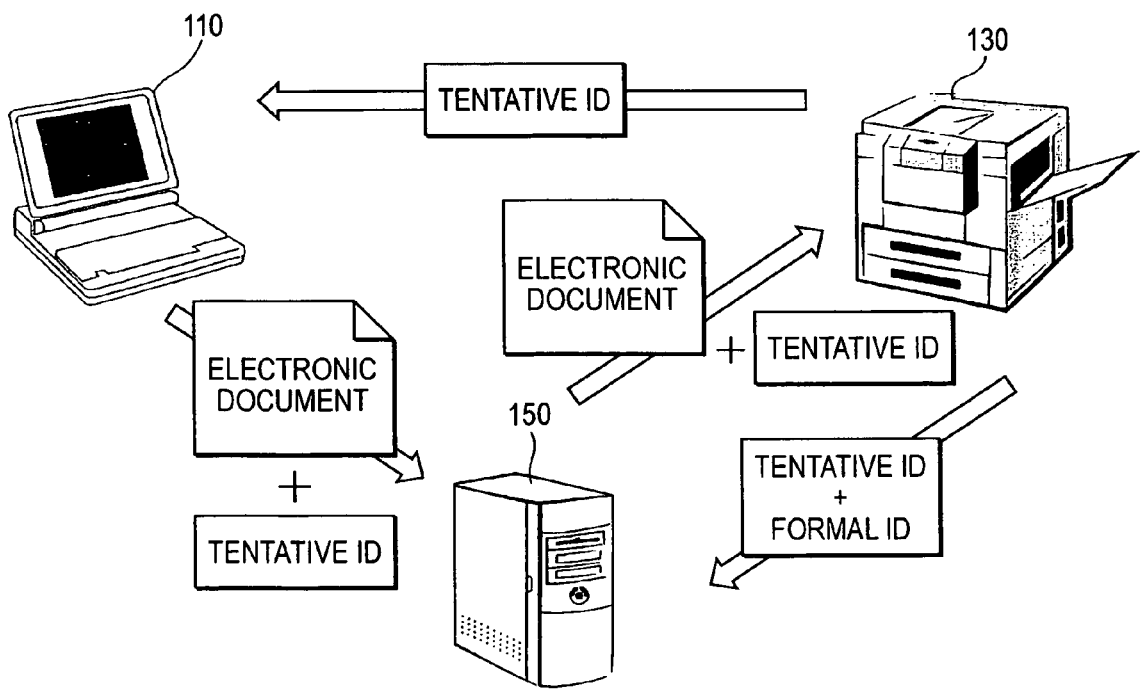

The processing pattern in FIG. 10D differs from those in FIGS. 10A to 10C, in the point that the electronic document and the tentative ID from the personal computer (PC) 110 are not directly transmitted to the print apparatus 130, but that they are transmitted to the document management apparatus 150. The document management apparatus 150 which has received the electronic document and the tentative ID, once stores the relation between the electronic document and the tentative ID in a memory (for example, the accumulation unit 152), and thereafter transfers the electronic document and the tentative ID to the print apparatus 130. In the print apparatus 130 having received the electronic document and the tentative ID, the formal ID is created, and information on the formal ID is printed onto the print medium. Thereafter, the print apparatus 130 transmits information on the corresponding relation between the tentative ID and the formal ID, to the print management apparatus 150. Besides, the print apparatus 130 transmits the information of the tentative ID to the personal computer (PC) 110. In the document management apparatus 150, the corresponding relation between the electronic document and the formal ID is grasped on the basis of the information of the corresponding relation between the electronic document and the tentative ID as stored in the memory and the information of the corresponding relation between the tentative ID and the formal ID as received anew, and it is stored in the accumulation unit 152. Incidentally, it is the same as in FIGS. 10A to 10C that, at the time when the corresponding relation between the formal ID and the electronic document has been grasped, the role of the tentative ID ends, whereupon the information of the tentative ID is abolished.

Figure 11A:
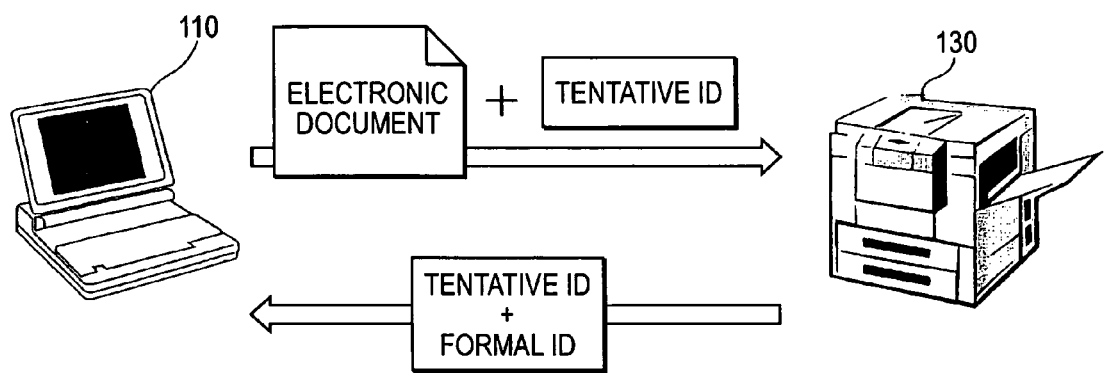
FIGS. 11A and 11B are views showing modifications to the processing patterns.
Figure 11B:
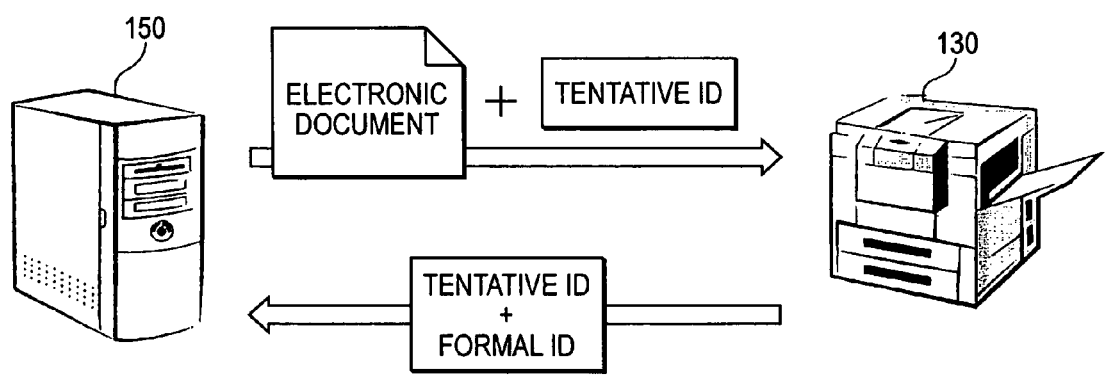

FIGS. 11A and 11B are views showing modifications to the processing patterns shown in FIGS. 10A to 10D.

Shown in FIG. 11A is a case where the function of the document management apparatus 150 is unitarily included in the personal computer (PC) 110. More specifically, after the electronic document and the tentative ID have been transmitted from the personal computer (PC) 110 to the print apparatus 130, the print apparatus 130 creates the formal ID and prints information on the formal ID, onto the print medium. Thereafter, the print apparatus 130 transmits information on the corresponding relation between the tentative ID and the formal ID, to the personal computer (PC) 110. In the personal computer (PC) 110, the corresponding relation between the electronic document and the tentative ID is originally grasped. Therefore, the relation between the formal ID and the electronic document as based on the received corresponding relation between the tentative ID and the formal ID is stored in a memory (not shown), in conformity with the data structure as shown in FIG. 6. Thus, it is permitted to link the electronic document and the print medium.

On the other hand, shown in FIG. 11B is a case where the function of the personal computer (PC) 110 is unitarily included in the document management apparatus 150. More specifically, after the electronic document and the tentative ID have been transmitted from the document management apparatus 150 to the print apparatus 130, the print apparatus 130 creates the formal ID and prints information on the formal ID, onto the print medium. Thereafter, the print apparatus 130 transmits information on the corresponding relation between the tentative ID and the formal ID, to the document management apparatus 150. In the document management apparatus 150, the corresponding relation between the electronic document and the tentative ID is originally grasped, and the relation between the formal ID and the electronic document as based on the received corresponding relation between the tentative ID and the formal ID is stored in the accumulation unit 152, in conformity with the data structure as shown in FIG. 6.

Figure 12:
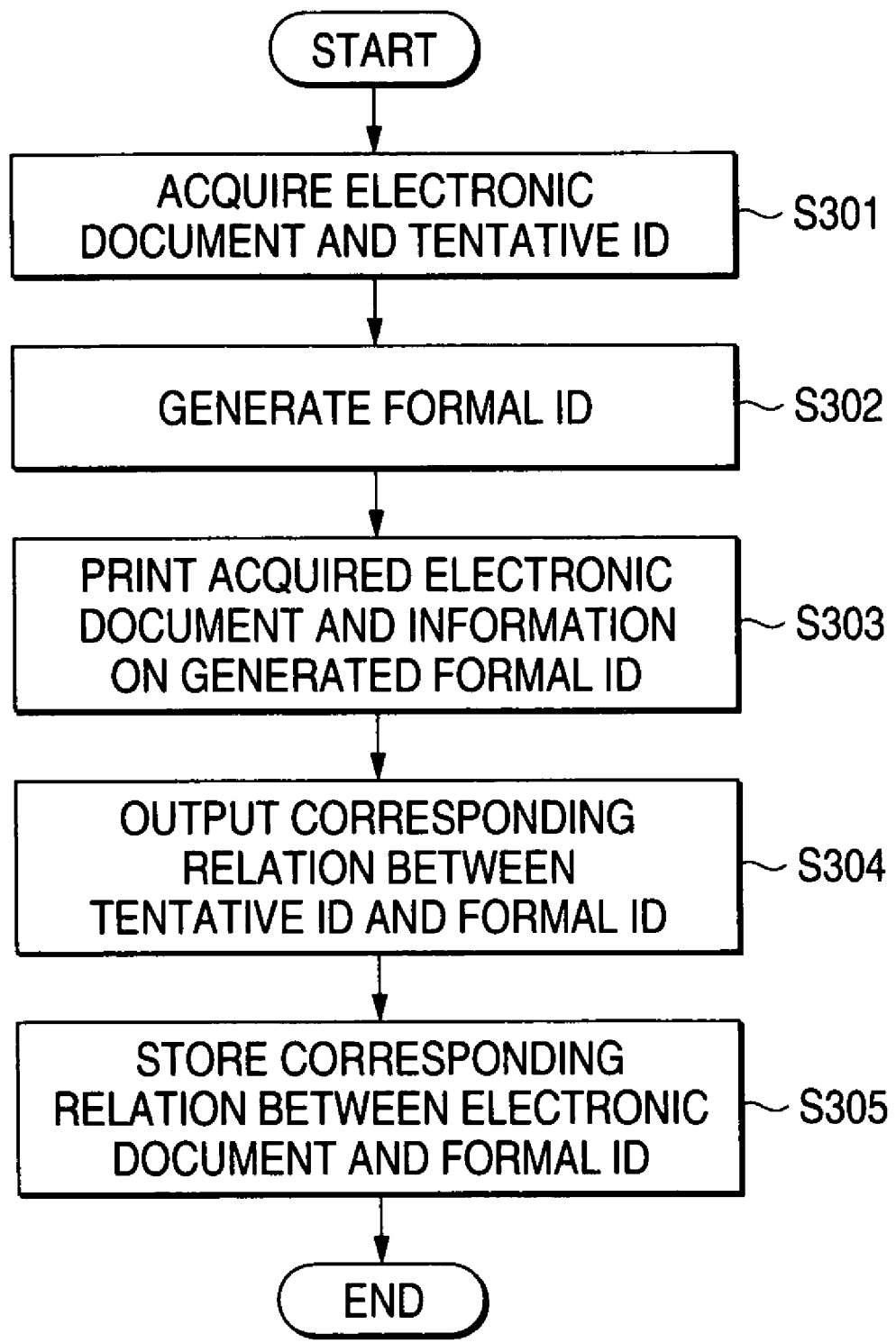
FIG. 12 is a flow chart showing a basic flow as to the process of the print instruction which employs the tentative ID.

FIG. 12 is a flow chart showing the flow of the basic process of the print instruction employing the tentative ID as shown in FIG. 10A or 10A, FIG. 10C or 10D, or FIG. 11A or 11B. First, in the print apparatus 130, an electronic document and a tentative ID are acquired (step 301). Here, the electronic document is identified by the tentative ID being first identification information. A source which offers these information items to the print apparatus 130 is the personal computer (PC) 110, but the document management apparatus 150 sometimes intervenes as shown in FIG. 10C. Besides, only the electronic document is sometimes transmitted from an external device. Further, the electronic document stored in the print apparatus 130 is sometimes employed.

Subsequently, in the print apparatus 130, a formal ID being second identification information is generated (step 302), and the acquired electronic document and information on the generated formal ID are printed onto a medium (step 303). In an excellent aspect, the formal ID to be printed is generated in printing the document image of the electronic document onto the medium. In some cases, however, the formal ID directly received from an external device or the like is employed. Besides, a code image being the information on the formal ID is printed in the printing onto the medium, and the code image is an invisible image in an excellent aspect. In some cases, however, the code image is a visible image.

Thereafter, the print apparatus 130 outputs the corresponding relation between the tentative ID being the first identification information and the formal ID being the second identification information to, for example, the document management apparatus 150 (step 304). In the document management apparatus 150 having acquired the corresponding relation between the tentative ID and the formal ID, an electronic document corresponding to the formal ID is acquired by any method, and the corresponding relation between the electronic document and the formal ID is stored in the accumulation unit 152 shown in FIG. 1 (step 305). This electronic document is sometimes acquired, for example, simultaneously in receiving the corresponding relation between the tentative ID and the formal ID. A case is also considered where the tentative ID and the electronic document are received from, for example, the personal computer (PC) 110. Owing to the above, the basic process is ended.

In this way, the document image of the electronic document and the code image containing the information of the formal ID are printed onto the medium (print medium) in the print apparatus 130, and the corresponding relation between the formal ID and the electronic document is stored in the memory (such as the accumulation unit 152) as a print result. After the relation between the formal ID and the electronic document has been stored in the memory after the printing of the code image and the document image, the tentative ID may well be deleted. Owing to the deletion of the tentative ID, another print instruction is permitted to use the same tentative ID.

In the result printed by the print apparatus 130, the code image as shown in FIG. 2 is formed using, for example, an invisible toner, on the image (characters, a pattern, a photograph or the like) from the electronic document. Thereafter, when a user has handwritten on the printed and outputted sheet of paper with the pen type input device 170 as shown in FIG. 7, locus information based on the handwriting and identification information recognized by the pen type input device 170 are transferred to, for example, the application control unit 112 of the personal computer 110 (refer to FIG. 1). The personal computer 110 transmits the transferred identification information to the document management apparatus 150. In the document management apparatus 150, the electronic document is specified from information accumulated in the accumulation unit 152 (for example, the database shown in FIG. 6), by using the identification information. Then, the electronic document accumulated in the accumulation unit 152 of the document management apparatus 150, for example, is transmitted to the personal computer 110. Alternatively, the electronic document stored in the external document repository can be transmitted to the personal computer 110 on the basis of a URL or the like accumulated in the accumulation unit 152. Thus, the personal computer 110 acquires the original data of the electronic document as to which the user has handwritten with the pen type input device 170. Besides, the personal computer 110 can execute various processes, for example, compositing the document image of the electronic document and the locus information and indicating the composited information items on a display.

As detailed above, according to this embodiment, in a system which prints also identification information in printing the document image of an electronic document, a simple tentative ID (print instruction specification information, or first identification information) is employed in a print instruction, whereby a time period required for data transfer can be sharply shortened. Besides, in the printing, a formal ID (specification information specifying the electronic document or a print medium, or second identification information) different from the tentative ID is generated, whereupon the printing is performed using the formal ID, whereby the identification information for identifying the electronic document or the print medium can be bestowed without the necessity for separately disposing a print server. Further, a relation with the electronic document or the print medium is managed using the formal ID, whereby the print instruction and a print result, the print result and the electronic document, etc. can be easily managed in association.

Further, in this embodiment, unlike management performed every electronic document, document management can be performed every printed output medium on the basis of the relation between an address space used for the output medium and an original document. Thus, even in a case, for example, where the document image of an electronic document as formed of the identical image has been printed a plurality of copies, respective media have different address spaces, so that inputs given with a pen type input device by a user can be identified and managed for the respective media.

Besides, such managements are remarkably excellent in the point that any sheet of paper on which dots or the likes are written beforehand need not be employed. Further, it is unnecessary to employ an address space in which addresses are previously allocated by an address management device or the like that collectively manages all the addresses, and an electronic document management system which is very conveniently used may be provided.

As previously described above, according to an aspect of the present invention, a print system for printing and outputting an electronic document includes a print instruction unit that outputs a print instruction for the electronic document and print instruction specification information for specifying the print instruction; a print unit that prints the electronic document pertinent to the print instruction outputted from the print instruction unit, together with specification information specifying the electronic document or a print medium; an output unit that outputs the specification information printed by the print unit, in association with the print instruction specification information; and a storage unit that inputs the specification information and the print instruction specification information that is outputted from the output unit, and associates the electronic document pertinent to the print instruction specification information and the specification information, and stores the associated electronic document and the specification information therein. Incidentally, the "electronic document" is not restricted to only text information, but it covers, e. g., image information such as a pattern or a photograph. The same applies to the ensuing description.

Here, the print system is characterized in that the specification information is information for uniquely specifying the print medium onto which a document image of the electronic document is printed. Besides, the print system may be characterized in that the print unit generates code information which contains the information for uniquely specifying the print medium, and address information within the print medium, and prints the generated code information and the document image of the electronic document onto the print medium. The address information is information which corresponds to, for example, the region of the document image of the electronic document. The address information within the print medium is contained in the code information, whereby the original document (electronic document) may be easily specified in case of reading the code information with, for example, an electronic pen. Thus, the print system may be remarkably superior to a prior-art technique which develops addresses allocated by a specified enterprise beforehand.

On the other hand, the print system of the invention may be including a print instruction apparatus which outputs a print instruction for the electronic document and print instruction specification information; a print apparatus which prints the electronic document pertinent to the print instruction outputted from the print instruction apparatus, together with specification information specifying the electronic document or a print medium; and a management apparatus which manages the electronic document; the print apparatus associating the print instruction specification information and the specification information, and outputting them to the management apparatus.

Here, the print system may be characterized in that the print instruction apparatus outputs the electronic document and the print instruction specification information to the management apparatus. Besides, the print system may be characterized in that the management apparatus inputs the electronic document, and that it associates the inputted electronic document and the specification information and then stores them in a memory, or that the management apparatus inputs the electronic document from the print apparatus. Besides, the print system may be characterized in that the management apparatus outputs the print instruction specification information or/and the specification information to the print instruction apparatus. Further, the print system may be characterized in that the management apparatus inputs the electronic document and the print instruction specification information from the print instruction apparatus, and that it associates the specification information outputted from the print apparatus, and the electronic document, and then stores them in a memory. Still further, the print system may be characterized in that the print apparatus outputs at least one of the print instruction specification information and the specification information to the print instruction apparatus after the printing of the electronic document including the specification information has been ended.

According to still another aspect of the present invention, a print apparatus includs a print instruction acquisition unit that acquirs print instruction specification information for specifying a print instruction, together with the print instruction for the electronic document; a print unit that prints the electronic document on the basis of the print instruction acquired by the print instruction acquisition unit, together with specification information specifying the electronic document or a print medium; and an output unit that associats the print instruction specification information and the specification information, and then outputting them.

Here, the print apparatus is characterized in that the specification information is information for uniquely specifying the print medium onto which a document image of the electronic document is printed; and that the print unit generates code information which contains the information for uniquely specifying the print medium, and address information within the print medium, and that it prints the generated code information and the document image of the electronic document onto the print medium. Besides, the print apparatus is characterized in that the output unit outputs the electronic document printed with a document image by the print unit, together with and in association with the print instruction specification information and the specification information. Further, the print apparatus is characterized in that the output unit outputs the print instruction specification information and the specification information to a document management apparatus which associates the electronic document and the specification information and then stores them in a memory. Further, the print apparatus may be characterized in that the output unit outputs the print instruction specification information or/and the specification information to a print instruction apparatus which has outputted the print instruction.

Incidentally, the code information which is generated in the invention may be formed so as to generate different code information items in a case where media to be printed differ in spite of an identical electronic document. Besides, in the printing, the code image is generated so as to contain the information uniquely specifying the medium, and the address information, whereby the original document (electronic document) can be easily specified.

On the other hand, when the invention is grasped from the category of a method, it may consist in a print processing method for printing a document image of an electronic document instructed to be printed, onto a medium, characterized by identifying the electronic document by using first identification information which is identifiable on a print instruction side, before the printing of the document image of the electronic document onto the medium is ended; identifying the electronic document by using second identification information which specifies the electronic document or the medium, after the document image of the electronic document and a code image which contains the second identification information have been printed onto the medium; and associating the first identification information and the second identification information, and then outputting them.

Here, the print processing method may be characterized in that, in associating and outputting the first identification information and the second identification information, the electronic document is also outputted. Besides, the print processing method may be characterized in that the first identification information and the electronic document are received from the print instruction side; and that the first identification information and the second identification information are transmitted to a document management apparatus. Further, the print processing method can be characterized in that the second identification information is generated in printing the document image of the electronic document.

Besides, the invention may be grasped as a storage medium which is installed in and executed by a computer. More specifically, a storage medium readable by a computer, the strage medium stores a program of instructions executable by a computer to perform a function, the function comprises: identifying the electronic document by using first identification information which is identifiable on a print instruction side, before the printing of the document image of the electronic document onto the medium is ended; a function of identifying the electronic document by using second identification information which specifies the electronic document or the medium, after the document image of the electronic document and a code image which contains the second identification information have been printed onto the medium; and a function of associating the first identification information and the second identification information, and then outputting them.

Here, the program is offered to the computer through a medium such as CD-ROM or DVD-ROM, in some cases, and it is offered from a program transmission apparatus in a remote place, to the computer through a network such as the Internet, in the other cases. Besides, the program is stored in, for example, a memory which is included in the computer of a print apparatus or a document management apparatus, and it is run by a CPU which is included in the computer.

According to an aspect of the present invention, in a system wherein, in case of printing the document image of an electronic document, identification information is also printed, a time period required for data transfer in case of giving a print instruction can be sharply shortened. Also, it may be expected to easily associate and manage the contents of the print instruction and a print result.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A print system comprising:
a print instruction unit that outputs an electronic document for printing and a tentative ID associated with the electronic document to a print apparatus, the print apparatus includes:
an identification unit that generates a formal ID uniquely specifying the electronic document or a print medium of the electronic document when printed;

a code unit that generates code information which contains the formal ID; a print unit that prints the electronic document together with the code information onto the print medium, wherein the formal ID is generated at a time when the print unit prints the electronic document and includes information indicating a printout time at which the print unit prints the electronic document and the code information onto the print medium; and an output unit that outputs the formal ID and the tentative ID associated with the formal ID to a document management unit, where the document management unit discards information of the tentative ID after the document management unit determines, based on the tentative ID, a correspondence between the formal ID and the electronic document.

2. The print system according to claim 1, further comprising a storage unit that inputs the formal ID and the tentative ID output from the output unit, and associates the electronic document pertinent to the tentative ID and the formal ID, and stores the associated electronic document and the formal ID.

3. The print system according to claim 1, wherein the formal ID includes information for uniquely specifying the print medium onto which a document image of the electronic document is printed.

4. The print system according to claim 3, wherein
the code unit generates code information which contains information for uniquely specifying the print medium and address information within the print medium, and the print unit prints the generated code information and the document image of the electronic document onto the print medium.

5. A print system comprising:
a print instruction apparatus that outputs an electronic document for printing and a tentative ID associated with the electronic document;
a print apparatus that generates a formal ID uniquely specifying the electronic document or a print medium of the electronic document when printed, that generates code information which contains the formal ID, and that prints the electronic document received from the print instruction apparatus together with the code information onto the print medium, wherein the formal ID is generated at a time when the print apparatus prints the electronic document and includes information indicating a printout time at which the print apparatus prints the electronic document and the code information onto the print medium; and
a management apparatus that manages the electronic document; wherein the print apparatus associates the tentative ID and the formal ID, and outputs the tentative ID and the formal ID, which are associated with each other, to the management apparatus, and
wherein the management apparatus discards information of the tentative ID after the management apparatus determines, based on the tentative ID, a correspondence between the formal ID and the electronic document.

6. The print system according to claim 5, wherein the print instruction apparatus outputs the electronic document and the tentative ID to the management apparatus.

7. The print system according to claim 5, wherein the management apparatus inputs the electronic document, associates the input electronic document and the formal ID, and stores the electronic document and the formal ID, which are associated with each other, in a memory.

8. The print system according to claim 5, wherein the management apparatus inputs the electronic document from the print apparatus.

9. The print system according to claim 5, wherein the management apparatus outputs at least one of the tentative ID and the formal ID to the print instruction apparatus.

10. The print system according to claim 5, wherein the management apparatus inputs the electronic document and the tentative ID from the print instruction apparatus, associates the formal ID output from the print apparatus and the electronic document, and stores the formal ID and the electronic document, which are associated with each other, in a memory.

11. The print system according to claim 5, wherein the print apparatus outputs at least one of the tentative ID and the formal ID to the print instruction apparatus after printing of the electronic document including the code information has been ended.

12. A print apparatus comprising:
a print instruction acquisition unit that acquires an electronic document and a tentative ID associated with the electronic document;
an identification unit that generates a formal ID uniquely specifying the electronic document or a print medium of the electronic document when printed;
a code unit that generates code information which contains the formal ID;
a print unit that prints the electronic document received from the print instruction acquisition unit together with the code information onto the print medium, wherein the formal ID is generated at a time when the print unit prints the electronic document and includes information indicating a printout time at which the print unit prints the electronic document and the code information onto the print medium; and
an output unit that associates the tentative ID and the formal ID, and then outputs the tentative ID and the formal ID, which are associated with each other to a document management unit, where the document management unit discards information of the tentative ID after the document management unit determines, based on the tentative ID, a correspondence between the formal ID and the electronic document.

13. The print apparatus according to claim 12, wherein:
the formal ID includes information for uniquely specifying the print medium onto which a document image of the electronic document is printed;
the code unit generates code information which contains the information for uniquely specifying the print medium and address information within the print medium; and
the print unit prints the generated code information and the document image of the electronic document onto the print medium.

14. The print apparatus according to claim 12, wherein
the output unit associates the electronic document, which has been printed as a document image by the print unit, with the tentative ID and the formal ID and outputs the electronic document, the tentative ID and the formal ID, which are associated with each other.

15. The print apparatus according to claim 12, wherein the output unit outputs the tentative ID and the formal ID to a document management apparatus which associates the electronic document and the formal ID and stores the electronic document and the formal ID, which are associated with each other, in a memory.

16. The print apparatus according to claim 12, wherein the output unit outputs at least one of the tentative ID and the formal ID to a print instruction apparatus which output the print instruction.

17. A print processing method comprising:
acquiring first identification information associated with an electronic document;
identifying the electronic document by using the first identification information before printing of a document image of the electronic document onto a medium is ended;
generating second identification information uniquely specifying the electronic document or the medium at a time of printing the document image of the electronic document and a code image which contains the second identification information onto the medium, wherein the second identification information includes information indicating a printout time at which the document image of the electronic document is printed onto the medium;
identifying the electronic document or the medium by using the second identification information after the document image of the electronic document and the code image are printed onto the medium; and
associating the first identification information and the second identification information and outputting the first identification information and the second identification information, which are associated with each other to a document management unit, where the document management unit discards information of the first identification information after the document management unit determines, based on the first identification information, a correspondence between the second identification information and the electronic document.

18. The print processing method according to claim 17, wherein the electronic document is also output when the first identification information and the second identification information are associated and output.

19. The print processing method according to claim 17, wherein:
the first identification information and the electronic document are received from a print instruction side; and
the first identification information and the second identification information are transmitted to a document management apparatus.

20. The print processing method according to claim 17, wherein the second identification information is generated in printing the document image of the electronic document.

21. A non-transitory storage medium readable by a computer, the storage medium storing a program of instructions executable by the computer to perform a function, the function comprising:
acquiring first identification information associated with an electronic document;
identifying the electronic document by using the first identification information before printing of a document image of the electronic document onto a medium is ended;
generating second identification information uniquely specifying the electronic document or the medium at a time of printing the document image of the electronic document and a code image which contains the second identification information onto the medium, wherein the second identification information includes information indicating a printout time at which the document image of the electronic document is printed onto the medium;
identifying the electronic document or the medium by using the second identification information after the document image of the electronic document and the code image are printed onto the medium; and
associating the first identification information and the second identification information and outputting the first identification information and the second identification information, which are associated with each other to a document management unit, where the document management unit discards information of the first identification information after the document management unit determines, based on the first identification information, a correspondence between the second identification information and the electronic document.

22. A print system comprising:
a print instruction apparatus that outputs an electronic document for printing and a tentative ID associated with the electronic document to a document management apparatus, wherein
the document management apparatus, upon receiving the electronic document and the tentative ID, stores the relation between the electronic document and the tentative ID and outputs the electronic document and the tentative ID to a print apparatus for printing,
the print apparatus generates a formal ID that includes information indicating a printout time at which the print apparatus prints the electronic document, generates code information which contains the formal ID, prints the electronic document together with the code information onto the print medium, associates the tentative ID and the formal ID, and outputs the tentative ID and the formal ID, which are associated with each other, to the document management apparatus, and
the document management apparatus discards information of the tentative ID after the document management apparatus determines, based on the tentative ID, a correspondence between the formal ID and the electronic document.

* * * * *